(12) United States Patent
Kang et al.

(10) Patent No.: US 11,381,973 B2
(45) Date of Patent: Jul. 5, 2022

(54) DATA TRANSMISSION METHOD, RELATED DEVICE, AND RELATED SYSTEM

(71) Applicant: Huawei International Pte. Ltd., Singapore (SG)

(72) Inventors: Xin Kang, Singapore (SG); Haiguang Wang, Singapore (SG); Zhongding Lei, Singapore (SG); Fei Liu, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 178 days.

(21) Appl. No.: 16/748,556

(22) Filed: Jan. 21, 2020

(65) Prior Publication Data

US 2020/0162922 A1 May 21, 2020

Related U.S. Application Data

(63) Continuation of application No. PCT/SG2017/050371, filed on Jul. 21, 2017.

(51) Int. Cl.
*H04W 12/106* (2021.01)
*H04W 12/06* (2021.01)
(Continued)

(52) U.S. Cl.
CPC .......... *H04W 12/106* (2021.01); *H04L 67/12* (2013.01); *H04W 12/033* (2021.01);
(Continued)

(58) Field of Classification Search
CPC . H04L 63/0807; H04L 63/0428; H04L 63/08; H04L 63/10; H04L 63/123;
(Continued)

(56) References Cited

U.S. PATENT DOCUMENTS 6,032,260 A * 2/2000 Sasmazel ............. G06F 21/335
726/10
7,373,508 B1 * 5/2008 Meier ................. H04W 12/065
713/168
(Continued)

FOREIGN PATENT DOCUMENTS

CN 101772024 B 10/2012
CN 104506502 A 4/2015
(Continued)

OTHER PUBLICATIONS

"EPS-AKAi: A primary authentication solution for 5G NR access," 3GPP TSG SA WG3 (Security) Meeting #87, Ljubljana, Slovenia, S3-171198, pp. 1-3, 3rd Generation Partnership Project, Valbonne, France (May 15-19, 2017).

(Continued)

*Primary Examiner* — Michael Simitoski
(74) *Attorney, Agent, or Firm* — Leydig, Voit & Mayer, Ltd.

(57) ABSTRACT

A data transmission method, a related device, and a related system. The method includes: receiving, by a first access network device, a data packet (for example, small data) sent by user equipment (for example, an IoT device), where the data packet includes a first cookie and raw data; verifying, by the first access network device, the first cookie, to obtain a verification result; and processing, by the first access network device, the raw data based on the verification result. Implementation of embodiments can reduce load on a network side when a large quantity of user equipments need to perform communication, thereby increasing data transmission efficiency.

16 Claims, 11 Drawing Sheets

(51) Int. Cl.
*H04W 12/108* (2021.01)
*H04L 67/12* (2022.01)
*H04W 12/033* (2021.01)
*H04W 12/041* (2021.01)

(52) U.S. Cl.
CPC ......... *H04W 12/041* (2021.01); *H04W 12/06* (2013.01); *H04W 12/108* (2021.01)

(58) Field of Classification Search
CPC ..... H04L 67/12; H04L 67/303; H04L 67/142; H04L 9/32; H04W 12/033; H04W 12/041; H04W 12/06; H04W 12/062; H04W 12/106; H04W 12/108
See application file for complete search history.

(56) References Cited

U.S. PATENT DOCUMENTS

| | | | | |
|---|---|---|---|---|
| 8,024,784 | B1* | 9/2011 | Issa | H04L 63/0281 726/9 |
| 9,860,324 | B1* | 1/2018 | Roskind | H04L 67/141 |
| 10,903,999 | B1* | 1/2021 | Raman | H04L 9/14 |
| 2003/0115341 | A1* | 6/2003 | Sinha | H04L 63/0807 709/229 |
| 2006/0075110 | A1* | 4/2006 | Seraphin | H04L 67/14 709/227 |
| 2006/0230265 | A1* | 10/2006 | Krishna | H04L 63/0281 713/158 |
| 2007/0160017 | A1* | 7/2007 | Meier | H04W 36/18 370/338 |
| 2007/0245137 | A1* | 10/2007 | Bhagat | H04L 67/146 713/153 |
| 2009/0305671 | A1* | 12/2009 | Luft | H04W 12/08 455/411 |
| 2010/0017603 | A1 | 1/2010 | Jones | |
| 2010/0228982 | A1* | 9/2010 | Zhu | H04L 9/3271 713/175 |
| 2013/0173801 | A1* | 7/2013 | Rajan | G06F 9/5055 709/225 |
| 2013/0298209 | A1* | 11/2013 | Targali | H04W 12/06 726/6 |
| 2016/0006726 | A1* | 1/2016 | Mizikovsky | H04W 12/069 713/171 |
| 2016/0248808 | A1* | 8/2016 | Stavrou | H04L 63/08 |
| 2016/0337321 | A1* | 11/2016 | Lin | H04L 9/3263 |
| 2016/0337373 | A1 | 11/2016 | Tseng et al. | |
| 2016/0374048 | A1 | 12/2016 | Griot et al. | |
| 2017/0041782 | A1 | 2/2017 | Yu | |
| 2017/0142638 | A1 | 5/2017 | Wang et al. | |
| 2017/0164194 | A1 | 6/2017 | Frederiksen et al. | |
| 2017/0324749 | A1* | 11/2017 | Bhargava | H04L 63/108 |
| 2017/0339163 | A1* | 11/2017 | Alhothaily | H04L 63/0428 |
| 2018/0139228 | A1* | 5/2018 | Kanakarajan | H04L 63/08 |
| 2019/0028559 | A1* | 1/2019 | Sampat | H04L 67/2814 |
| 2019/0223129 | A1* | 7/2019 | Starsinic | H04W 8/24 |

FOREIGN PATENT DOCUMENTS

| | | |
|---|---|---|
| WO | 2007102702 A2 | 9/2007 |
| WO | 2014183535 A1 | 11/2014 |

OTHER PUBLICATIONS

"3rd Generation Partnership Project; Technical Specification Group Services and System Aspects; Service requirements for the 5G system; Stage 1 (Release 16)," 3GPP TS 22.261 V16.0.0, pp. 1-49, 3rd Generation Partnership Project, Valbonne, France (Jun. 2017).

"3rd Generation Partnership Project; Technical Specification Group Services and System Aspects; Study on Architecture for Next Generation System (Release 14)," 3GPP TR 23.799 V14.0.0, pp. 1-522, 3rd Generation Partnership Project, Valbonne, France (Dec. 2016).

"3rd Generation Partnership Project; Technical Specification Group Services and System Aspects; Study on the security aspects of the next generation system (Release 14)," 3GPP TR 33.899 V1.2.0, pp. 1-586, 3rd Generation Partnership Project, Valbonne, France (Jun. 2017).

"3rd Generation Partnership Project; Technical Specification Group Radio Access Network; Study on New Radio Access Technology; Radio Interface Protocol Aspects (Release 14)," 3GPP TR 38.804 V14.0.0, pp. 1-57, 3rd Generation Partnership Project, Valbonne, France (Mar. 2017).

"3rd Generation Partnership Project; Technical Specification Group Services and System Aspects; 3GPP System Architecture Evolution (SAE); Security architecture (Release 15)," 3GPP TS 33.401 V15.0.0, pp. 1-153, 3rd Generation Partnership Project, Valbonne, France (Jun. 2017).

Arkko et al., "Extensible Authentication Protocol Method for 3rd Generation Authentication and Key Agreement (EAP-AKA)," RFC4187, pp. 1-79, Network Working Group (Jan. 2006).

"3rd Generation Partnership Project; Technical Specification Group Services and System Aspects; 3G Security Security architecture (Release 14)," 3GPP TS 33.102 V14.1.0, pp. 1-77, 3rd Generation Partnership Project, Valbonne, France (Mar. 2017).

"A Ticket-Based Solution for Small Data Transmission in User Plane," 3GPP TSG SA WG3 (Security) Meeting #85, Santa Cruz de Tenerife (Spain), S3-161683, XP051185771, pp. 1-4, 3rd Generation Partnership Project, Valbonne, France (Nov. 7-11, 2016).

* cited by examiner

| Cookie ID | Expire time | Cookie type | En(UE ID, master key) | En(counter, master key) | Second MAC |
|---|---|---|---|---|---|

| Cookie | En(raw data, cookie key) | First MAC |
|---|---|---|

FIG. 3

| Cookie ID | Expire time | Cookie type | RAN ID | Second MAC |
|---|---|---|---|---|

| Cookie | En(raw data, cookie key) | First MAC |
|---|---|---|

FIG. 4

| Cookie ID | Expire time | Cookie type | RAN ID | En(UE ID, master key) | En(counter, master key) | Second MAC |
|---|---|---|---|---|---|---|

| Cookie | En(raw data, cookie key) | First MAC |
|---|---|---|

FIG. 5

| AT_IV <new cookie key and/or new cookie> |
|---|
| AT_ENCR_DATA <new cookie and/or new cookie key> |
| *AT_COUNTER |
| *AT_NONCE_S |
| *AT_NEXT_REAUTH_ID <new cookie ID> |
| AT_MAC |

FIG. 8

DATA TRANSMISSION METHOD, RELATED DEVICE, AND RELATED SYSTEM

CROSS-REFERENCE TO RELATED APPLICATIONS

This application is a continuation of International Application No. PCT/SG2017/050371, filed on Jul. 21, 2017. The disclosure of the aforementioned application is hereby incorporated by reference in its entirety.

TECHNICAL FIELD

This application relates to the field of communications technologies, and in particular, to a data transmission method, a related device, and a related system.

BACKGROUND

With rapid development of the mobile Internet, an increasing quantity of internet of things (IoT) devices in vertical industries need to access a communications network operated by an operator. Different from a conventional mobile device, the IoT devices are characterized by a large quantity, and an IoT device sends sporadic small data for most of the time in a life cycle.

In a current communications network (for example, a cellular network), user equipment usually accesses the network by verifying an identity and a symmetric key that are included in a universal subscriber identity module (USIM) card. An authentication manner of the user equipment mainly includes an EPS-AKA (evolved packet system-authentication and key agreement) authentication protocol.

When the user equipment needs to transmit data, usually the user equipment first performs network authentication with a network side, establishes a communication connection after the authentication, and then sends the data to the network side. Then, for the internet of things, tens of thousands of communication connection requirements of IoT devices bring huge communication load on the network side. In an authentication solution that is based on a USIM symmetric key, because an authentication chain is relatively long and authentication efficiency is low, data transmission efficiency is greatly reduced. This also becomes an obstacle that restricts large-scale application and a user quantity increase of the interne of things.

SUMMARY

Embodiments of the present invention disclose a data transmission method, a related device, and a related system, to reduce load on a network side when a large quantity of user equipments need to perform communication, thereby increasing data transmission efficiency.

According to a first aspect, an embodiment of the present invention provides a data transmission method. The method includes: receiving, by a first access network device, a data packet sent by user equipment, where the data packet includes a first cookie and raw data; verifying, by the first access network device, the first cookie, to obtain a verification result; and processing, by the first access network device, the raw data based on the verification result.

In one embodiment, the first cookie includes an expire time T, and if it is assumed that an access network device verifies the first cookie at a time T0, the verifying, by the first access network device, the first cookie, to obtain a verification result includes: if $T0<T-TX$, the verification result is that the first cookie is valid; if $T-TX<T0<T+TX$, the verification result is that the first cookie is to expire; or if $T0>T+TX$, the verification result is that the first cookie is invalid, where TX is a preset time value.

Correspondingly, if the verification result is that the first cookie is valid, the first access network device decrypts the raw data, and sends the decrypted raw data to a core network device; if the verification result is that the first cookie is to expire, the first access network device performs fast re-authentication with the user equipment, to update the first cookie in the user equipment, and sends the decrypted raw data to a core network device; or if the verification result is that the first cookie is invalid, the first access network device performs two-way authentication with the user equipment, to prove that an identity of the user equipment is valid, and then re-configures a new cookie for the user equipment.

In this embodiment of the present invention, the first access network device generates the first cookie, and sends the first cookie to the user equipment. A specific generation process includes: performing, by the first access network, two-way authentication with the user equipment; and after the authentication succeeds, generating, by the access network device, the first cookie based on a user equipment identifier.

In one embodiment, the first cookie further includes a first cookie type, where the first cookie type is used to indicate that the first cookie is generated by an access network device or a core network device; and when the first cookie type indicates that the first cookie is verified by the access network device, the first access network device verifies the first cookie.

In one embodiment, the first cookie further includes: a first cookie ID and a first message authentication code MAC, where first MAC=HMAC(first cookie ID||expire time||first cookie type||first cookie key), where the first cookie key is a key derived by the access network device, and first cookie key=KDF(first cookie ID, expire time, first cookie type, K); and HMAC is a hash-based message authentication code related to the key, KDF is a key derivation function, and K is a master key preset by the first access network device. After receiving the data packet, the first access network device identifies the first cookie based on the first cookie ID, and performs an integrity check on the first cookie based on the first MAC.

In a possible embodiment, the first cookie further includes: the encrypted user equipment identifier and an encrypted fast re-authentication counter; and the first MAC is specifically: first MAC=HMAC(first cookie ID||expire time||first cookie type||En(user equipment identifier, K)||En (fast re-authentication counter, K), first cookie key), where En is an encryption function.

In this embodiment of the present invention, when the cookie is to expire, the first access network device performs fast re-authentication with the user equipment, to update the cookie in the user equipment. A process includes: generating, by the first access network device, a second cookie; and sending, by the first access network device, a first message to the user equipment, to update the first cookie and the first cookie key in the user equipment, where the first message includes the second cookie, a second cookie key, and a second cookie ID, and the second cookie key is a key derived by the first access network device based on the preset master key. During specific implementation, the first message is a fast re-authentication message, and the fast re-authentication message includes an AT_IV field, an AT_ENCR_DATA field, and an encrypted AT_NEXT_REAUTH_ID field, where the AT_IV field carries the second cookie key and/or the second cookie, the AT_EN-CR_DATA field carries the second cookie and/or the second cookie key, and the encrypted AT_NEXT_REAUTH_ID field carries the second cookie ID.

In a possible embodiment, the first cookie further includes a first access network device identifier RAN ID, and the RAN ID is used to indicate an ID of an access network device that generates the first cookie. After the first access network device receives the data packet sent by the user equipment, the first access network device checks whether the RAN ID is an ID of the first access network device, and the following cases are included:

Case 1: If the RAN ID is the ID of the first access network device, the first access network device verifies the first cookie.

Case 2: If the RAN ID is not the ID of the access network, the first access network device sends the first cookie to a second access network device indicated by the RAN ID, and the first access network device receives first cookie information fed back by the second access network device based on the first cookie, where the first cookie information is stored in the second access network device, and the first cookie information includes the first cookie ID, the first cookie key, and the user equipment identifier. Specifically, the first access network device verifies the first cookie based on the first cookie information. In a possible embodiment, the first access network device further generates a third cookie and a third cookie key based on the user equipment identifier, and sends the third cookie and the third cookie key to the user equipment, so that the user equipment updates the first cookie and the first cookie key by using the third cookie and the third cookie key, where a RAN ID in the third cookie indicates the ID of the first access network device.

In one embodiment, that the first access network device sends the first cookie to a second access network device indicated by the RAN ID includes two cases:

Case 1: If there is an X2 interface between the first access network device and the second access network device, the first access network device sends, by using the X2 interface, the first cookie to the second access network device indicated by the RAN ID.

Case 2: If there is no X2 interface between the first access network device and the second access network device, the first access network device sends, by using the core network device, the first cookie to the second access network device indicated by the RAN ID.

In a possible application scenario, when the RAN ID is not the ID of the access network, after sending the data packet to a third access network device indicated by the RAN ID, the first access network device receives the decrypted raw data fed back by the third access network device, and sends the decrypted raw data to a core network. In addition, the first access network device may further receive a key fed back by the third access network device, where the key is generated by the third access network device based on the first cookie key and the ID of the first access network. The first access network device generates a fourth cookie and a fourth cookie key based on the user equipment identifier, where a RAN ID in the fourth cookie indicates the ID of the first access network device. Then, the access network device sends the fourth cookie and the fourth cookie key encrypted by using the key to the user equipment, so that the user equipment updates the first cookie and the first cookie key by using the fourth cookie and the fourth cookie key.

In this embodiment of the present invention, the user equipment identifier may be an international mobile subscriber identity (IMSI), or may be an international mobile equipment identity (IMEI), a media access control (MAC) address, an internet protocol (IP) address, a mobile phone number, an IP multimedia private identity (IMPI), a temporary mobile subscriber identity (TMSI), an IP multimedia public identity IMPU), a globally unique temporary UE identity (GUTI), or the like.

In this embodiment of the present invention, the data packet specifically includes the first cookie, the raw data encrypted by using the first cookie key, and a second MAC.

In this embodiment of the present invention, the user equipment may be an internet of things (IoT) device, and the data packet may be small data.

According to a second aspect, an embodiment of the present invention provides another data transmission method. The method includes: receiving, by a core network device, a data packet sent by user equipment, where the data packet includes a first cookie and encrypted raw data; verifying, by the core network device, the first cookie, to obtain a verification result; and processing, by the core network device, the raw data based on the verification result.

In one embodiment, the first cookie includes a first cookie type, and the first cookie type is used to indicate that the first cookie is verified by an access network device or a core network device. When the first cookie type indicates that the first cookie is verified by the core network device, the core network device receives, by using the access network device, the data packet sent by the user equipment.

In a specific embodiment, the first cookie includes an expire time T, and an access network verifies the first cookie at a time T0, where if T0<T−TX, the verification result is that the first cookie is valid;

if T−TX<T0<T+TX, the verification result is that the first cookie is to expire; or if T0>T+TX, the verification result is that the first cookie is invalid, where TX is a preset time value. Correspondingly, if the verification result is that the first cookie is valid, the core network device decrypts the raw data, and sends the decrypted raw data to a target server. If the verification result is that the first cookie is to expire, the core network device performs fast re-authentication with the user equipment, to update the first cookie in the user equipment, and sends the decrypted raw data to a target server.

Specifically, before the core network device receives the data packet sent by the user equipment, the core network device generates the first cookie, and sends the first cookie to the user equipment.

A process of generating the first cookie by the core network device may include: performing, by the core network device, two-way authentication with the user equipment; and after the authentication succeeds, generating, by the core network device, the first cookie based on a user equipment identifier.

In one embodiment, the first cookie further includes: a first cookie ID and a first message authentication code MAC, where first MAC=HMAC(first cookie ID||expire time||first cookie type||first cookie key), where the first cookie key is a key derived by the core network device, and first cookie key=KDF(first cookie ID, expire time, first cookie type, K), and HMAC is a hash-based message authentication code related to the key, KDF is a key derivation function, and K is a master key preset by the core network device. The core network device identifies the first cookie based on the first cookie ID, and performs an integrity check on the first cookie based on the first MAC.

In one embodiment, the first cookie further includes: the encrypted user equipment identifier and an encrypted fast re-authentication counter; and the first MAC is specifically: first MAC=HMAC(first cookie ID||expire time||first cookie type||En(user equipment identifier, K)||En(fast re-authentication counter, K), first cookie key), where En is an encryption function.

When the cookie is to expire, the core network device performs fast re-authentication with the user equipment, to update the cookie in the user equipment, where the fast re-authentication includes: generating, by the core network device, a second cookie; and sending, by the core network device, a first message to the user equipment, to update the first cookie and the first cookie key in the user equipment, where the first message includes the second cookie, a second cookie key, and a second cookie ID, and the second cookie key is a key derived by the core network device based on the preset master key.

In one embodiment, the first message is a fast re-authentication message, and the fast re-authentication message specifically includes an AT_IV field, an AT_ENCR_DATA field, and an encrypted AT_NEXT_REAUTH_ID field, where the AT_IV field carries the second cookie key and/or the second cookie, the AT_ENCR_DATA field carries the second cookie and/or the second cookie key, and the encrypted AT_NEXT_REAUTH_ID field carries the second cookie ID.

In one embodiment, the data packet includes the first cookie, raw data encrypted by using the first cookie key, and a second MAC.

In one embodiment, the user equipment is an interne of things device IoT, and the data packet is small data small data.

According to a third aspect, an embodiment of the present invention provides a data transmission method. The method is described from a user equipment side, and includes: receiving, by user equipment, a first cookie and a first cookie key that are sent by a network device; generating, by the user equipment, a data packet based on the first cookie and the first cookie key, where the data packet includes the first cookie and raw data encrypted by using the first cookie key; and sending, by the user equipment, the data packet to the network device.

In one embodiment, the first cookie includes an expire time T, and an access network verifies the first cookie at a time T0, where if T0<T−TX, the verification result is that the first cookie is valid;

if T−TX<T0<T+TX, the verification result is that the first cookie is to expire; or if T0>T+TX, the verification result is that the first cookie is invalid, where TX is a preset time value.

When T is about to expire, the user equipment receives a first message sent by the network device, where the first message includes a second cookie, a second cookie key, and a second cookie ID, and the second cookie key is a key derived by a first access network device based on a preset master key. The user equipment updates the first cookie and the first cookie key by using the second cookie and the second cookie key.

In one embodiment, the network device is an access network device or a core network device, the user equipment is an internet of things device IoT, and the data packet is small data small data.

According to a fourth aspect, an embodiment of the present invention provides an access network device. The access network device includes: a processor, a memory, a transmitter, and a receiver, to implement functions of the access network device according to the first aspect.

According to a fifth aspect, an embodiment of the present invention provides another access network device. The access network device includes: a receiving module, an authentication module, and a sending module, to implement functions of the access network device according to the first aspect.

According to a sixth aspect, an embodiment of the present invention provides a core network device. The core network device includes: a processor, a memory, a transmitter, and a receiver, to implement functions of the core network device according to the second aspect.

According to a seventh aspect, an embodiment of the present invention provides another core network device. The core network device includes: a receiving module, an authentication module, and a sending module, to implement functions of the core network device according to the second aspect.

According to an eighth aspect, an embodiment of the present invention provides user equipment. The user equipment includes: a processor, a memory, a transmitter, and a receiver, to implement functions of the user equipment according to the third aspect.

According to a ninth aspect, an embodiment of the present invention provides another user equipment. The user equipment includes: a receiving module, a data module, and a sending module, to implement functions of the user equipment according to the third aspect.

According to a tenth aspect, an embodiment of the present invention provides a communications system. The communications system includes: the access network device according to the fourth aspect or the fifth aspect or the core network device according to the sixth aspect or the seventh aspect, and the user equipment according to the eighth aspect or the ninth aspect.

According to an eleventh aspect, an embodiment of the present invention provides a readable non-volatile storage medium storing a computer instruction. The readable non-volatile storage medium includes the computer instruction, where the computer instruction is executed to implement the method according to the first aspect; or the computer instruction is executed to implement the method according to the second aspect; or the computer instruction is executed to implement the method according to the third aspect of the claims.

According to a twelfth aspect, an embodiment of the present invention provides a computer program product. When the computer program product is run on a computer, the computer program product is executed to implement the method described in the first aspect, or is executed to implement the method described in the second aspect, or is executed to implement the method described in the third aspect.

After implementation of the embodiments of the present invention, when the user equipment such as the IoT device accesses a network for the first time, the user equipment performs authentication with the network to verify an identity, and obtains a cookie issued by the network side (the access network device or the core network device). Then, when the user equipment has a requirement for transmitting data (for example, small data), the user equipment directly sends the data packet carrying the cookie to the network side, and does not need to perform authentication and establish a network connection again. The network side verifies validity of the identity of the user equipment by verifying the cookie. After the verification on the cookie succeeds, the network side directly processes transmission of the data. The implementation of the embodiments of the present invention can reduce load on the network side when a large quantity of user equipments need to perform communication, thereby increasing data transmission efficiency.

BRIEF DESCRIPTION OF DRAWINGS

FIG. 1 is a schematic diagram of a communications architecture according to an embodiment of the present invention;

FIG. 2 to FIG. 5 are schematic diagrams of several data packet formats according to embodiments of the present invention;

FIG. 8 is a schematic diagram of a fast re-authentication message according to an embodiment of the present invention;

DESCRIPTION OF EMBODIMENTS

Figures 1, 2:
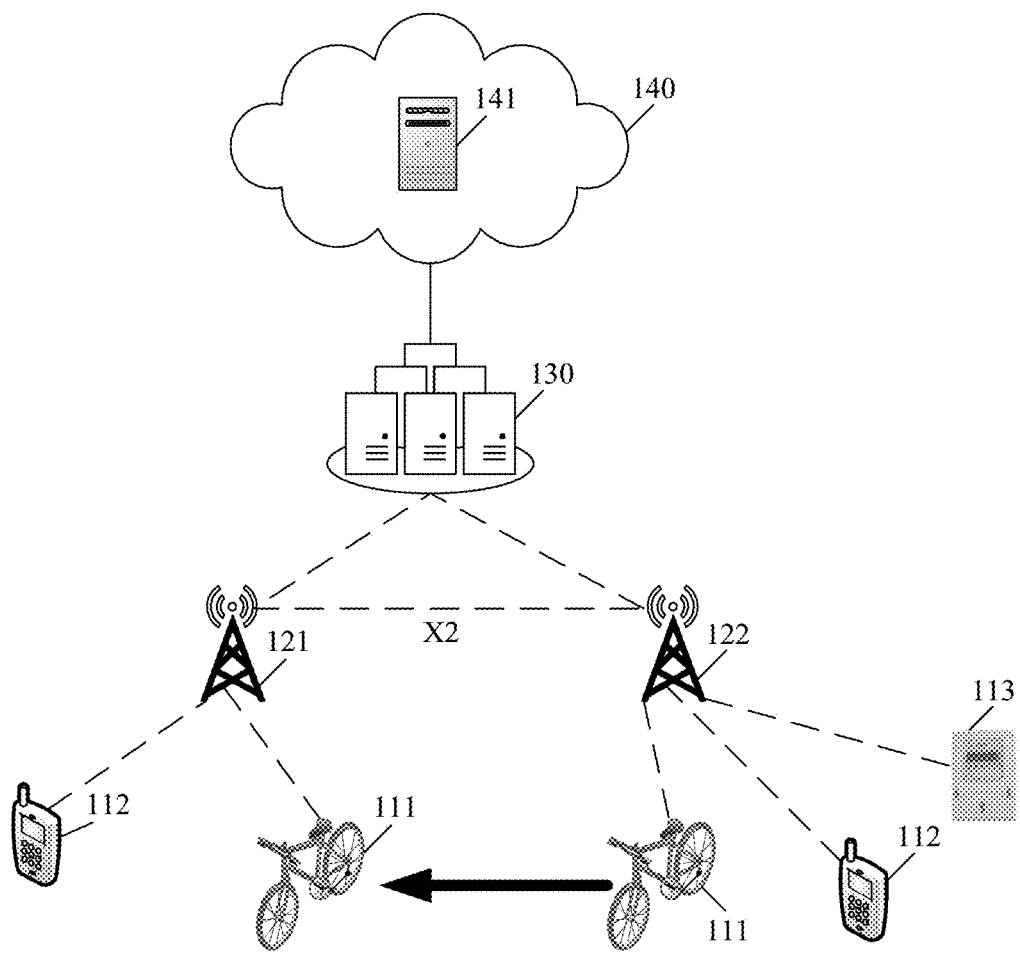

For ease of understanding of the solutions, a network architecture to which solutions in embodiments of this application are applied is first described with reference to a related accompanying drawing by using an example. A communications network architecture provided in the embodiments of the present invention includes user equipment, an access network, and a core network. Referring to FIG. 1, there may be a plurality of devices in the access network (access network device for short, such as an access network device 121 or an access network device 122 in FIG. 1). Each access network device may establish a communication connection with one or more user equipments (for example, user equipment 111, user equipment 112, and user equipment 113 in FIG. 1), to perform uplink communication or downlink communication. Different access network devices separately establish a communication connection with the core network 130, and different access network devices may also have a communication connection between each other (for example, the access network device 121 and the access network device 122 are connected by using an X2 interface in FIG. 1). The core network 130 may establish a communication connection with an external network 140. The network 140 is, for example, a data network (DN), and the network 140 may include an application server 141. Details are described as follows.

The user equipment (UE) is a logical entity. The UE may be an internet of things (IoT) device, or may be a terminal device or a communications device in a specific application scenario. For example, the IoT device may be a sensor, a smart electricity meter (for example, the user equipment 113 in FIG. 1), a smart water meter, a smart air conditioner, a smart bicycle (for example, the user equipment 111 in FIG. 1), or a smart automobile, and the terminal device may be a smartphone (for example, the user equipment 112 in FIG. 1), a smart watch, or a smart tablet. The communications device may be a server, a gateway (GW), a controller, or the like.

The access network (AN) may also be referred to as a radio access network (RAN) in a specific application, and the RAN includes an access network device, and is responsible for access by the user equipment. The RAN may be a base station (such as an NB, an eNB, or a gNB), a wireless fidelity (Wi-Fi) access point, a Bluetooth access point, or the like.

The core network (CN) includes a core network device, and the CN, as a bearer network, provides an interface to an external network (for example, the DN), and provides services such as communication connection, authentication, management, and policy control for the UE.

The communications network architecture may support non-mobility communication and mobility communication of the UE.

For example, in a specific application scenario, the UE is the smart electricity meter 113. Because the smart electricity meter 113 is usually disposed at a fixed location, the smart electricity meter has non-mobility. When the smart electricity meter 113 needs to communicate with the application server 141 in the network 140, the smart electricity meter 113 may first establish a communication connection with the access network device 122, and then access the application server 141 by using the core network 130, to implement the communication.

For another example, in another specific application scenario, the UE is the smart bicycle 111. Because a location of the smart bicycle 111 changes when the smart bicycle 111 moves, the smart bicycle 111 has mobility. When the smart bicycle 111 needs to communicate with the application server 141 in the network 140, if the smart bicycle 111 is located in a communications cell of the access network device 122, the smart bicycle 111 first establishes a communication connection with the access network device 122, and then accesses the application server 141 by using the core network 130. After the smart bicycle 111 moves to a communications cell of the access network device 121, the smart bicycle 111 switches to establish a communication connection with the access network device 121, and then accesses the application server 141 by using the core network 130.

In the prior art, when the UE has a communication requirement, the UE first needs to perform network authentication with a network side, and can establish a communication connection with the access network device only when the network authentication succeeds, and then send data to the network. If a quantity of UEs increases, a large quantity of times of network authentication need to be performed to establish a large quantity of network connections. For example, for the internet of things (IoT), a quantity of IoT devices is large, and an IoT device usually discontinuously performs data transmission with the network. Consequently network authentication and network connection establishment need to be performed for each time of data transmission. Facing network authentication and network connections of a large quantity of IoT devices, the network side needs to bear great communication load, and data transmission efficiency is very low. To resolve a disadvantage in data transmission in the prior art, the present invention provides a data transmission solution, to reduce load on the network side when a large quantity of UEs need to perform communication, thereby increasing data transmission efficiency.

To implement the technical solutions in the embodiments of the present invention, a data packet in communication transmission needs to be redesigned. The following first describes several data packet formats in the embodiments of the present invention. Refer to FIG. 2 to FIG. 5. A data packet in the embodiments of the present invention includes a cookie, raw data (which may be encrypted or not encrypted), and a message authentication code (MAC). The cookie in the embodiments of the present invention is a small amount of information that is generated by a network device (an access network device or a core network device), may be stored in UE, and is used to authenticate validity of an identity of the UE. In the embodiments of the present invention, the data packet may be designed into different formats based on different cookies. The following describes several data packet formats.

(1) A First Type of Data Packet

Referring to FIG. 2, the first type of data packet includes a cookie, En(raw data, cookie key), and a first MAC.

En(raw data, cookie key) indicates raw data encrypted by using a cookie key, and En is an encryption function.

The first MAC is used to perform integrity protection on data.

The cookie is used as a credential for authenticating identity validity of the UE. Specifically, the cookie may include a cookie ID, an expire time, a cookie type, and a second MAC.

The cookie ID is an identification identifier of the cookie, and may be further used as an identifier of fast re-authentication in the embodiments of the present invention.

The expire time is used to indicate a validity period of the cookie.

The cookie type (type) indicates whether the cookie is generated by an access network device or a core network device.

The second MAC is used to perform integrity protection on the cookie, and may specifically be: second MAC=HMAC(cookie ID∥expire time∥type, Ki). HMAC is a hash-based message authentication code related to the key, and Ki is a cookie key. In the embodiments of the present invention, the cookie key is a key derived for the UE based on a master key in the network device. A specific derivation method is: Ki=KDF(cookie ID, expire time, type, K). K indicates the master key (master key), and KDF is a key derivation function.

For the first type of data packet, to implement that a network side completes authentication on the identity validity of the UE based on the cookie in the data packet in the embodiments of the present invention, the network side needs to store a context of the UE, to be specific, store cookie information associated with the cookie ID. The cookie information includes a UE identifier (UE ID), the master key, and a counter used for fast re-authentication (F-counter). The UE ID may be an international mobile subscriber identity (International Mobile Subscriber Identity, IMSI). After receiving the first type of data packet, the network side may further derive the cookie key based on Ki=KDF(cookie ID, expire time, type, K).

(2) A Second Type of Data Packet

Referring to FIG. 3, the second type of data packet includes a cookie, En(raw data, cookie key), and a first MAC.

En(raw data, cookie key) indicates raw data encrypted by using a cookie key, and En is an encryption function.

The first MAC is used to perform integrity protection on data.

The cookie is used as a credential for authenticating identity validity of the UE. Specifically, the cookie includes a cookie ID, an expire time, a cookie type, En(UE ID, master key), En(counter, master key), and a second MAC.

The cookie ID is an identification identifier of the cookie, and may be further used as an identifier of fast re-authentication (fast re-authentication) in the embodiments of the present invention.

The expire time is used to indicate a validity period of the cookie.

The cookie type (type) indicates whether the cookie is generated by an access network device or a core network device.

En(UE ID, master key) indicates a UE identifier (UE ID) encrypted by using a master key, and the UE ID may be, for example, an IMSI.

En(F-counter, master key) indicates a counter used for fast re-authentication (F-counter) that is encrypted by using the master key.

The second MAC is used to perform integrity protection on the cookie, and may specifically be: second MAC=HMAC(cookie ID∥expire time∥type∥En(UE ID, K)∥En(F-counter, K), Ki). HMAC is a hash-based message authentication code related to the key, Ki is a cookie key, and specifically, Ki=KDF(cookie ID, expire time, type, K). K indicates the master key (master key), and KDF is a key derivation function.

For the second type of data packet, to implement that a network side completes authentication on the identity validity of the UE based on the cookie in the data packet in the embodiments of the present invention, the network side only needs to store the master key, and does not need to store a context of the UE (that is, stored cookie information is the master key). In addition, after receiving the second type of data packet, the network side may further derive the cookie key based on Ki=KDF(cookie ID, expire time, type, K).

By comparing the first type of data packet with the second type of data packet, it can be found that, compared with the second type of data packet, the first type of data packet has a smaller data volume, thereby reducing communication load. Compared with the first type of data packet, the second type of data packet has a smaller storage volume on the network side, thereby reducing storage pressure on the network side.

(3) A Third Type of Data Packet

Referring to FIG. 4, the third type of data packet includes a cookie, En(raw data, cookie key), and a first MAC.

En(raw data, cookie key) indicates raw data encrypted by using a cookie key, and En is an encryption function.

The first MAC is used to perform integrity protection on data.

The cookie is used as a credential for authenticating identity validity of the UE. Specifically, the cookie may include a cookie ID, an expire time, a cookie type, a RAN ID, and a second MAC.

The cookie ID is an identification identifier of the cookie, and may be further used as an identifier of fast re-authentication (fast re-authentication) in the embodiments of the present invention.

The expire time is used to indicate a validity period of the cookie.

The cookie type (type) indicates whether the cookie is generated by an access network device or a core network device.

The RAN ID indicates an identifier of an access network device that generates the cookie.

The second MAC is used to perform integrity protection on the cookie, and may specifically be: MAC=HMAC (cookie ID||expire time||type||RAN ID, Ki). HMAC is a hash-based message authentication code related to the key, and Ki is a cookie key. Specifically, Ki=KDF(cookie ID, expire time, type, RAN ID, K). K indicates a master key, and KDF is a key derivation function.

For the third type of data packet, to implement that a network side completes authentication on the identity validity of the UE based on the cookie in the data packet in the embodiments of the present invention, the network side needs to store a context of the UE, to be specific, store cookie information associated with the cookie ID. The cookie information includes a UE identifier (UE ID), the master key, and a counter used for fast re-authentication (F-counter), and the UE ID may be an IMSI. After receiving the third type of data packet, the network side may further derive the cookie key based on Ki=KDF(cookie ID, expire time, type, RAN ID, K).

(4) A Fourth Type Oo Data Packet

Referring to FIG. 5, the fourth type of data packet includes a cookie, En(raw data, cookie key), and a first MAC.

En(raw data, cookie key) indicates raw data encrypted by using a cookie key, and En is an encryption function.

The first MAC is used to perform integrity protection on data.

The cookie is used as a credential for authenticating identity validity of the UE. Specifically, the cookie includes a cookie ID, an expire time, a cookie type, a RAN ID, En(UE ID, master key), En(counter, master key), and a second MAC.

The cookie ID is an identification identifier of the cookie, and may be further used as an identifier of fast re-authentication (fast reauthentication) in the embodiments of the present invention.

The expire time is used to indicate a validity period of the cookie.

The cookie type (type) indicates whether the cookie is generated by an access network device or a core network device.

The RAN ID indicates an identifier of an access network device that generates the cookie.

En(UE ID, master key) indicates a UE identifier (UE ID) encrypted by using a master key, and the UE ID may be, for example, an IMSI.

En(F-counter, master key) indicates a counter used for fast re-authentication (F-counter) that is encrypted by using the master key.

The second MAC is used to perform integrity protection on the cookie, and may specifically be: MAC=HMAC (cookie ID||expire time||type||RAN ID||En(UE ID, K)||En(F-counter, K), Ki). HMAC is a hash-based message authentication code related to the key, Ki is a cookie key, and specifically, Ki=KDF(cookie ID, expire time, type, RAN ID, K).

For the fourth type of data packet, to implement that a network side completes authentication on the identity validity of the UE based on the cookie in the data packet in the embodiments of the present invention, the network side only needs to store the master key, and does not need to store a context of the UE (that is, stored cookie information is the master key). In addition, after receiving the fourth type of data packet, the network side may further derive the cookie key based on Ki=KDF(cookie ID, expire time, type, RAN ID, K).

Compared with the first type of data packet and the second type of data packet, the RAN ID is added to the cookie of the third type of data packet and the fourth type of data packet. In other words, the third type of data packet and the fourth type of data packet may be applied to a mobility communication scenario, and the first type of data packet and the second type of data packet may be applied to a non-mobility communication scenario.

In addition, by comparing the third type of data packet with the fourth type of data packet, it can be found that, compared with the fourth type of data packet, the third type of data packet has a smaller data volume, thereby reducing communication load. Compared with the third type of data packet, the fourth type of data packet has a smaller storage volume on the network side, thereby reducing storage pressure on the network side.

Based on the foregoing communications architecture and re-designed data packets, the following describes a data transmission method provided in this embodiment.

Figure 6:
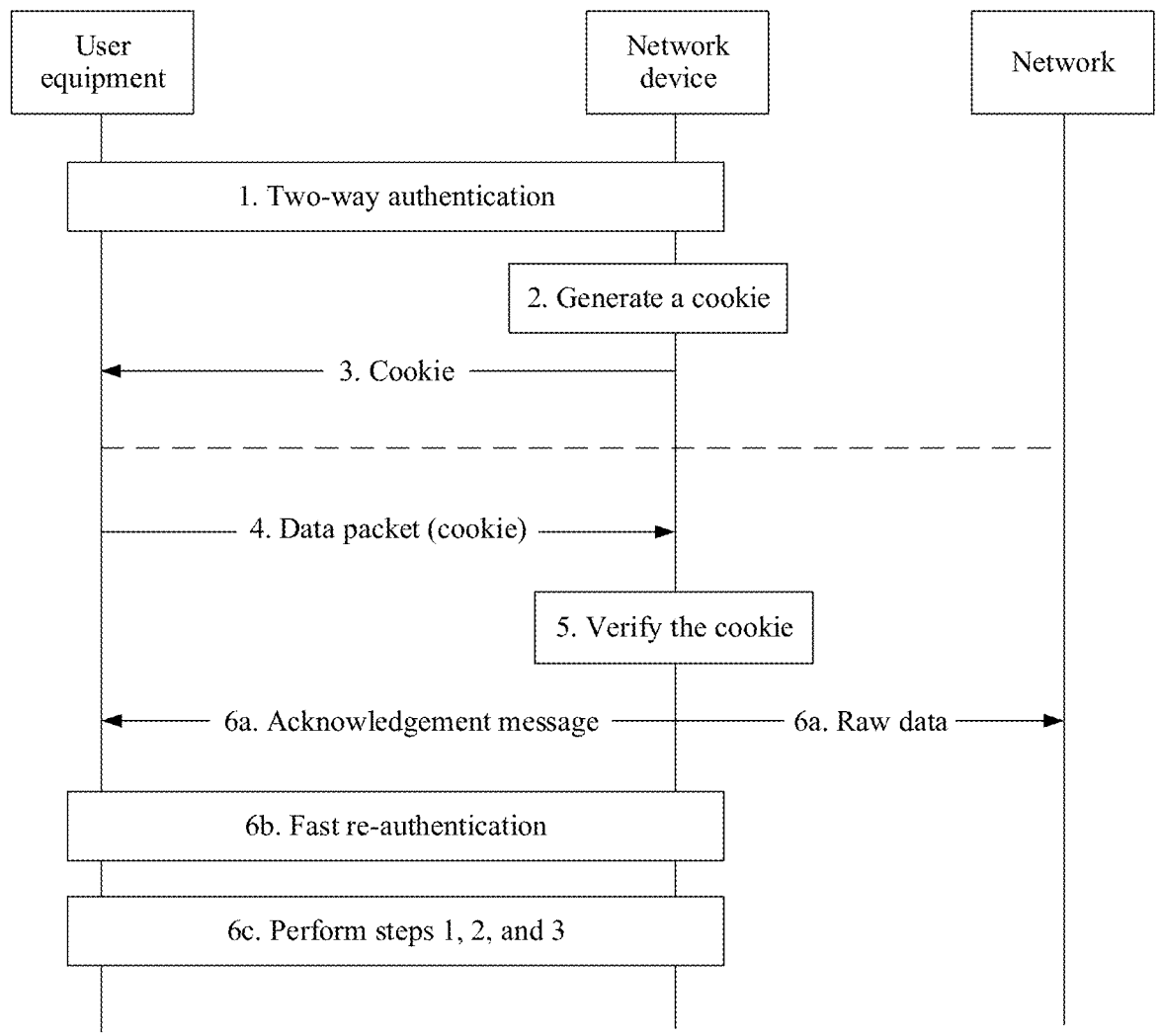
FIG. 6 is a schematic flowchart of a data transmission method according to an embodiment of the present invention.

Referring to FIG. 6, an embodiment of the present invention provides a data transmission method, including but not limited to the following steps.

1. User equipment performs two-way authentication with a network device.

After the verification succeeds, the network device determines that an identity of the UE is authentic and valid. In this embodiment of the present invention, the network device is an access network device or a core network device (for example, an access network device or a core network device in a cellular network).

2. The network device generates a cookie.

Specifically, a network device may generate the cookie for the user equipment based on a user equipment identifier (UE ID). The UE ID is used to represent the identity of the UE. For example, the UE ID may be one or more of an international mobile subscriber identity (IMSI), an international mobile equipment identity (IMEI), a media access control (MAC) address, an internet protocol (IP) address, a mobile phone number, an IP multimedia private identity (IMPI), a temporary mobile subscriber identity (TMSI), an IP multimedia public identity (IMPU), a globally unique temporary UE identity (GUTI), and the like.

3. The network device sends the cookie to the user equipment.

Correspondingly, after obtaining the cookie sent by the network device, the UE saves the cookie to a local storage.

It should be noted that, the foregoing steps 1, 2, and 3 are used to explain that a network side configures a corresponding cookie for the UE after the identity of the UE is determined as valid. In other words, during application of this embodiment of the present invention, the foregoing steps 1, 2, and 3 need to be performed only when the identity authentication on the UE is performed for the first time or subsequent data transmission fails and the two-way authentication needs to be re-performed.

When the UE has completed cookie configuration, if the UE needs to perform data transmission with the network side, the following steps 4 to 6 (including 6a, 6b, and 6c) may be directly performed. Details are described as follows.

4. The user equipment sends a data packet to the network device.

In a specific embodiment of the present invention, the data packet is small data (small data).

When the UE has a requirement for sending small data, the UE directly sends the small data to the network device. The small data carries the cookie. For a format of the small data, refer to the descriptions in the embodiments of FIG. 2 to FIG. 5. Details are not described herein again.

5. The network device verifies the cookie.

After receiving the data packet, the network side checks a cookie type of the cookie in the data packet, to be specific, checks whether the cookie type indicates the access network device or the core network device, to determine whether the data packet is processed by the access network device or the core network device. The determined access network device or core network device then verifies the cookie in the data packet based on cookie information pre-stored in the local storage.

In a specific embodiment of the present invention, after receiving the data packet, the network side checks the stored cookie information, and performs an integrity check on the cookie based on a second MAC of the cookie in the data packet. If the integrity check succeeds, the network side continues to check whether there is a correspondence between a cookie ID in the data packet and the UE identifier; and then checks an expire time (T for short) in the cookie. It is assumed that the network side verifies the cookie at a time T0, and then:

if T0<T−TX, a verification result is that the cookie is valid;

if T−TX<T0<T+TX, a verification result is that the cookie is to expire; and if T0>T+TX, a verification result is that the cookie is invalid, where TX is a preset time value, for example, a value of TX may be 20 s, 10 min, 1 h, or another user-defined preset value.

If the verification result is that the cookie is complete and valid, the verification on the cookie succeeds, and step 6a is subsequently performed. If the verification result is that the cookie is to expire, step 6b is subsequently performed. If the verification result is that the cookie is invalid, it indicates that the verification on the cookie fails, and step 6c is subsequently performed.

6a. The network device sends an acknowledgment message (Ack) to the user equipment, and sends the raw data to a network.

On one hand, the determined access network device or core network device sends the Ack to the UE, to notify the UE that data is successfully received. On the other hand, if the raw data in the data packet is in an encrypted state, the determined access network device or core network device decrypts the raw data based on the locally stored cookie information, and sends the decrypted raw data to an external network (for example, to an application server in the network).

6b. The network device performs fast re-authentication with the user equipment.

Specifically, the determined access network device or core network device performs the fast re-authentication with the UE based on the cookie ID and a cookie key. After the fast re-authentication, the UE obtains and stores an updated valid cookie and a new cookie key, to avoid expiration of the cookie stored by the UE.

For the raw data in the data packet, in a specific embodiment, the network device sends the decompressed raw data to the external network. In another specific embodiment, the network device may discard the data packet, and after the fast re-authentication, the UE may generate a new data packet by using the new cookie, the new cookie key, and the raw data, and then resend the new data packet to the network side.

6c. The network device and the user equipment re-perform steps 1, 2, and 3.

When the verification result is that the cookie is invalid, the network device may discard the data packet. In addition, the network device needs to re-perform the two-way authentication with the UE, to re-determine whether the identity of the UE is authentic and valid. If the authentication succeeds, the network device re-generates a new cookie for the UE, and sends the new cookie to the UE. The UE stores the new cookie. It may be understood that subsequently, the UE may generate a new data packet by using the new cookie, a new cookie key, and the raw data, and then resend the new data packet to the network side.

It may be learned that, after implementation of this embodiment of the present invention, when the user equipment such as an IoT device accesses the network for the first time, the user equipment performs authentication with the network to verify the identity, and obtains the cookie issued by the network side (the access network device or the core network device). Then, when the user equipment has a requirement for transmitting data (for example, small data), the user equipment directly sends the data packet carrying the cookie to the network side, and does not need to perform authentication and establish a network connection again. The network side verifies validity of the identity of the user equipment by verifying the cookie. After the verification on the cookie succeeds, the network side directly processes transmission of the data. The implementation of this embodiment of the present invention can reduce load on the network side when a large quantity of user equipments need to perform communication, thereby increasing data transmission efficiency.

Figure 7:
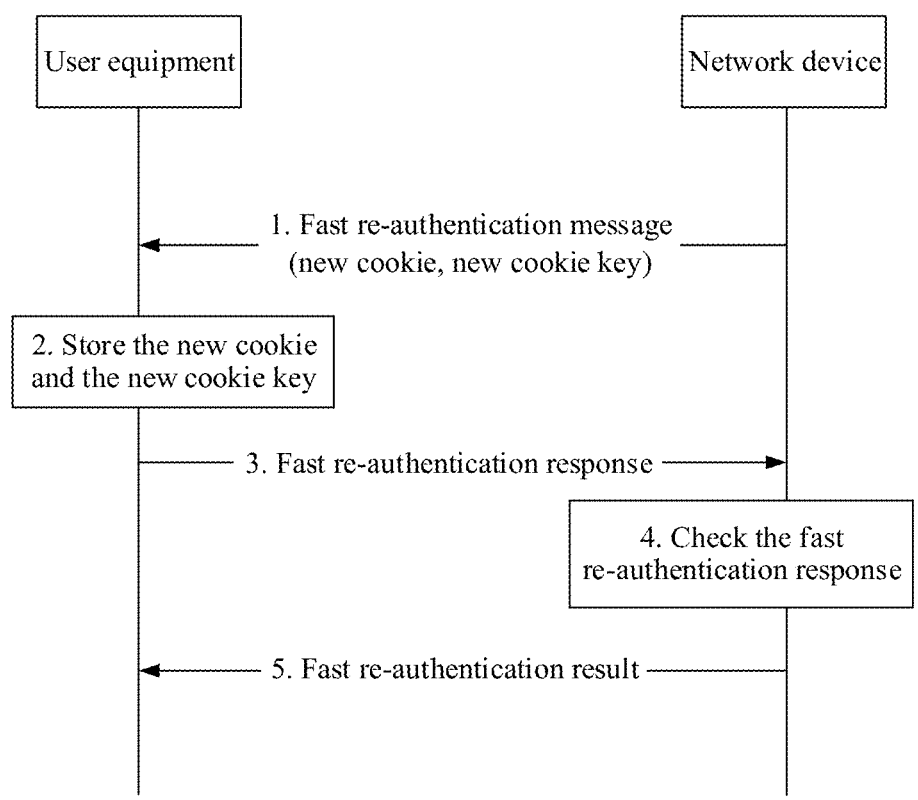
FIG. 7 is a schematic flowchart of a fast re-authentication method according to an embodiment of the present invention.

The following describes in detail the fast re-authentication (fast reauthentication) used in this embodiment of the present invention. When the network side receives the data packet sent by the UE, detects that the cookie in the data packet is to expire, and further detects, based on a fast re-authentication counter, that the cookie ID of the cookie supports the fast re-authentication, the network device performs the fast re-authentication with the user equipment. Refer to FIG. 7, a fast re-authentication process includes but is not limited to the following steps.

1. The network device sends a fast re-authentication message (fast reauthentication message) to the user equipment, where the fast re-authentication message includes a new cookie and a new cookie key, and may further include a new cookie ID.

Referring to FIG. 8, during specific implementation, the fast re-authentication message specifically includes:

(1) an AT_IV field;
(2) an AT_ENCR_DATA field;
(3) an encrypted AT_COUNTER field;
(4) an encrypted AT_NONCE_S field; and
(5) an encrypted AT_NEXT_REAUTH_ID field.

The AT_IV field may include the new cookie key and/or the new cookie. The AT_ENCR_DATA field may include the new cookie and/or the new cookie key. The encrypted AT_NEXT_REAUTH_ID field may include the new cookie ID.

The encrypted AT_COUNTER field may indicate an encrypted fast re-authentication counter, and is used to specify a quantity of times of fast re-authentication and the current time of the fast re-authentication. The encrypted AT_NONCE_S indicates an encrypted random number value nonce generated by a server, and is used to prevent a replay attack (Replay Attacks). An AT_MAC is used to perform integrity protection on the entire fast re-authentication message.

2. The user equipment stores the new cookie and the new cookie key.

After receiving the fast re-authentication message, the user equipment performs an integrity check based on the AT-MAC, and verifies the fast re-authentication counter. After the verification succeeds, the user equipment saves the new cookie and the new cookie key to a local storage.

3. The user equipment sends a fast re-authentication response to the network device.

The UE sends the fast re-authentication response to the network device. During specific implementation, the fast re-authentication response may include the AT_IV field, the AT_ENCR_DATA field, the encrypted AT_COUNTER field (whose value is the same as a value of the AT_COUNTER in the fast re-authentication message), and the AT_MAC field.

4. The network device checks the fast re-authentication response.

In a specific embodiment, after receiving the fast authentication response, the network side may perform an integrity check based on the AT_MAC.

5. The network device sends a fast re-authentication result to the user equipment.

After the verification in step 4 succeeds, the network device sends the fast re-authentication result to the user equipment, to notify the user equipment that fast re-authentication of this time succeeds.

After implementation of this embodiment of the present invention, in a data transmission process between the user equipment and the network side, if the cookie is to expire, the network side performs fast re-authentication with the user equipment, thereby rapidly updating the cookie in the user equipment, and ensuring that subsequent data transmission can be successfully performed. The implementation of this embodiment of the present invention helps reduce load on the network side when a large quantity of user equipments need to perform communication, thereby increasing data transmission efficiency.

Figure 9:
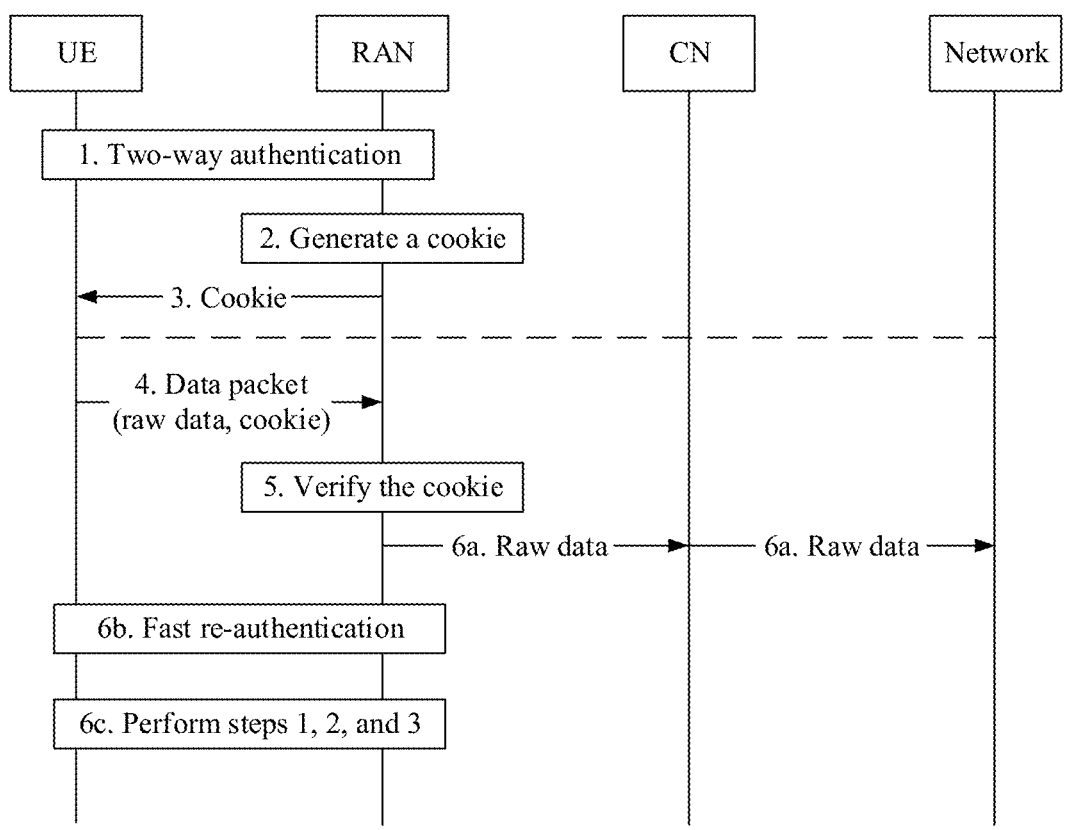
FIG. 9 is a schematic flowchart of another data transmission method according to an embodiment of the present invention.

Referring to FIG. 9, an embodiment of the present invention provides another data transmission method, including but not limited to the following steps.

1. UE performs two-way authentication with a RAN, and if the verification succeeds, it is determined that an identity of the UE is authentic and valid.

2. The RAN generates a cookie.

The RAN generates the cookie for the UE based on related information of the UE, and specifically, generates the cookie for the UE based on a UE ID.

3. The RAN sends the cookie to the UE, and correspondingly, after obtaining the cookie sent by the RAN, the UE saves the cookie to a local storage.

It should be noted that, the foregoing steps 1, 2, and 3 are used to explain that a network side configures a corresponding cookie for the UE after the identity of the UE is determined as valid. In other words, during application of this embodiment of the present invention, the foregoing steps 1, 2, and 3 need to be performed only when the identity authentication on the UE is performed for the first time or subsequent data transmission fails and the two-way authentication needs to be re-performed.

When the UE has completed cookie configuration, if the UE needs to perform data transmission with the network side, the following steps 4 to 6 (including 6a, 6b, and 6c) may be directly performed. Details are described as follows.

4. The UE sends a data packet to the RAN.

In a specific embodiment of the present invention, the data packet may include small data (small data).

When the UE has a requirement for sending small data, the UE directly sends the small data to the RAN. The small data carries the cookie. For a format of the small data, refer to the descriptions in the embodiments of FIG. 2 and FIG. 3. Details are not described herein again.

5. The RAN verifies the cookie.

After receiving the data packet, the RAN checks a cookie type of the cookie in the data packet, and determines that the data packet is processed by an access network device. The RAN then verifies the cookie in the data packet based on cookie information pre-stored in the local storage. For a specific verification process, refer to the description in step 5 in the embodiment of FIG. 6. Details are not described herein again.

If a verification result is that the cookie is complete and valid, it indicates that the verification on the cookie succeeds, and step 6a is subsequently performed. If a verification result is that the cookie is to expire, step 6b is subsequently performed. If a verification result is that the cookie is invalid, it indicates that the verification on the cookie fails, and step 6c is subsequently performed.

6a. The RAN sends raw data to a CN, and the CN sends the raw data to an external network.

The RAN performs an integrity check based on a first MAC in the data packet. After the verification succeeds, the RAN decrypts the raw data.

For example, if the raw data in the data packet is encrypted by using a cookie key, the RAN derives the cookie key (Ki for short) based on the received cookie and a stored master key (K for short). A specific derivation method is: Ki=KDF(cookie ID, expire time, cookie type, K). Then, the RAN decrypts the raw data.

The RAN sends the decrypted data to the core network CN, and the CN forwards the data to the external network. In a specific application scenario, if the UE is an IoT device, and the IoT device needs to communicate with an IoT device platform, the CN forwards the data to the IoT platform. Then, the IoT platform sends an acknowledgment message (Ack) to the CN, to indicate, to the CN, that the data is received. The CN sends an acknowledgment message (Ack) to the RAN, to indicate, to the RAN, that the data is received. The RAN further sends an acknowledgment message (Ack) to the IoT device, to indicate, to the IoT device, that the data is received.

6b. The RAN performs fast re-authentication with the UE.

The RAN may perform the fast re-authentication with the UE based on a cookie ID and a cookie key. For a detailed process, refer to the descriptions in the embodiments of FIG. 7 and FIG. 8. Details are not described herein again.

For the raw data in the data packet, in a specific embodiment, the RAN sends decompressed raw data to the CN/the external network. In another specific embodiment, the RAN may discard the data packet, and after the fast re-authentication, the UE may generate a new data packet by using a new cookie, a new cookie key, and the raw data, and then resend the new data packet to the RAN.

6c. The RAN and the UE re-perform steps 1, 2, and 3.

Refer to the description in step 6c in the embodiment of FIG. 6. Details are not described herein again.

The foregoing embodiment of FIG. 9 may be applied to a non-mobility communication scenario. After implementation of this embodiment of the present invention, when the UE, such as the IoT device, accesses the network for the first time, after performing authentication with the network side to verify the identity, the UE obtains the cookie issued by the RAN. Then, when the UE has a requirement for transmitting data (for example, small data), the UE directly sends the data packet carrying the cookie to the RAN, and does not need to perform authentication and establish a network connection again. The RAN verifies validity of the identity of the UE by verifying the cookie. After the verification on the cookie succeeds, the RAN directly processes subsequent transmission of the data, to complete data communication. Implementation of this embodiment of the present invention can reduce load on the network side when a large quantity of UEs need to perform communication, thereby increasing data transmission efficiency.

Figure 10:
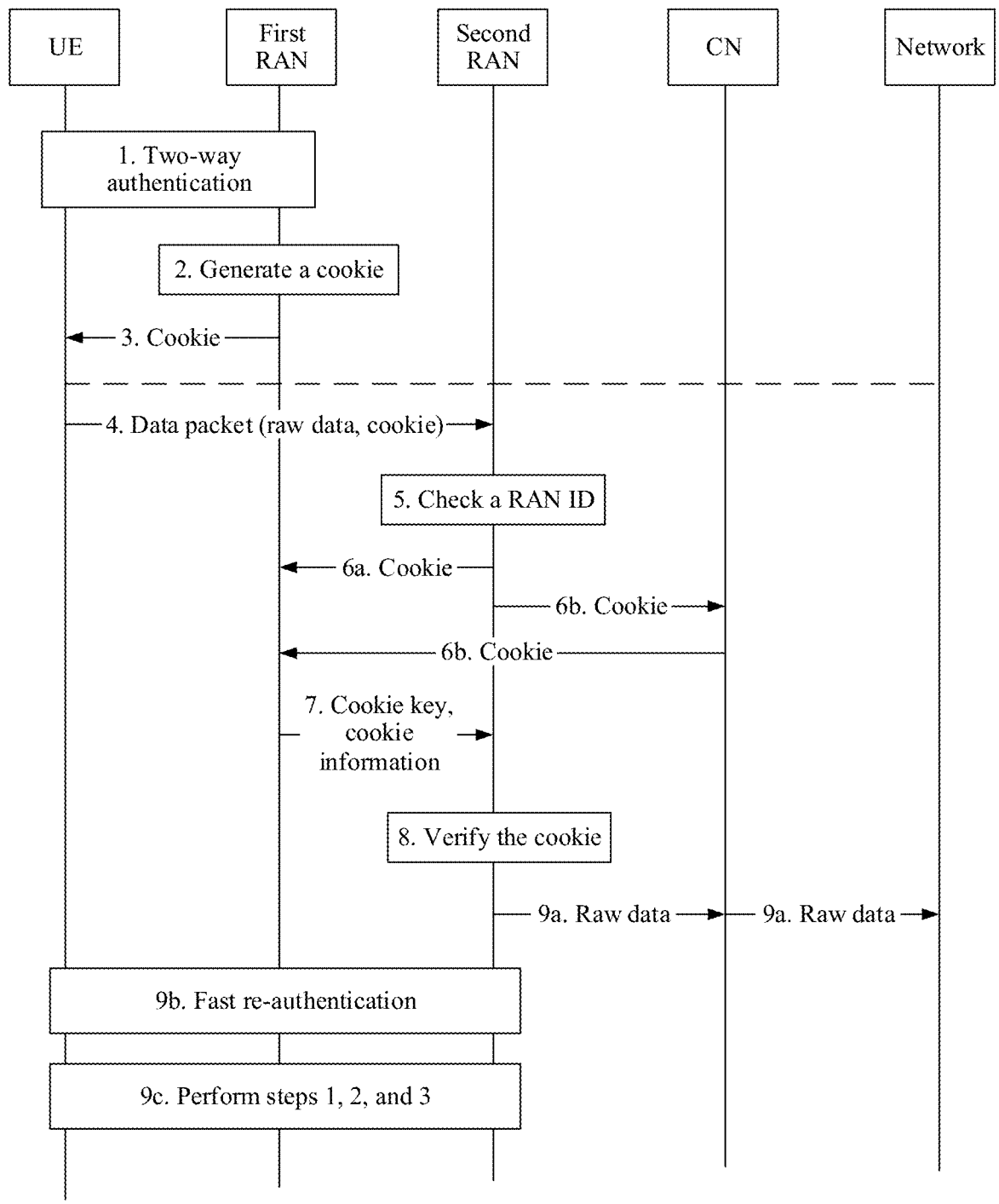
FIG. 10 is a schematic flowchart of another data transmission method according to an embodiment of the present invention.

Referring to FIG. 10, an embodiment of the present invention provides another data transmission method, including but not limited to the following steps.

1. UE performs two-way authentication with a first RAN, and if the verification succeeds, it is determined that an identity of the UE is authentic and valid.

2. The first RAN generates a cookie.

Specifically, the first RAN may generate the cookie for the UE based on a UE ID.

3. The first RAN sends the cookie to the UE. After obtaining the cookie, the UE saves the cookie to a local storage.

It should be noted that, the foregoing steps 1, 2, and 3 are used to explain that a network side configures a corresponding cookie for the UE after the identity of the UE is determined as valid. In other words, during application of this embodiment of the present invention, the foregoing steps 1, 2, and 3 need to be performed only when the identity authentication on the UE is performed for the first time or subsequent data transmission fails and the two-way authentication needs to be re-performed.

When the UE has completed cookie configuration, if the UE needs to perform data transmission with the network side, the following steps 4 to 9 (including 9a, 9b, and 9c) may be directly performed. Details are described as follows.

4. The UE sends a data packet to a second RAN.

In a specific application scenario, the UE may need to switch current communication from the first RAN to the second RAN.

For example, when a location of the UE moves from a communication cell of the first RAN to a communication cell of the second RAN, current communication needs to be switched from the first RAN to the second RAN.

For another example, when network communication load of the first RAN is excessively heavy, the UE may need to switch, according to a preset rule, current communication to the second RAN with normal network communication load to perform data transmission.

When the UE has a requirement for sending a data packet (for example, small data), the UE directly sends the data packet to the second RAN. The data packet carries the cookie. For a format of the data packet, refer to the descriptions in the embodiments of FIG. 4 and FIG. 5. Details are not described herein again.

5. The second RAN checks a RAN ID included in the cookie.

After receiving the data packet, the second RAN checks a cookie type in the cookie, and determines that the cookie type indicates an access network device. Then, the second RAN checks the RAN ID included in the cookie, and finds that the RAN ID is not an ID of the second RAN, but is an ID of the first RAN (namely, a first RAN ID). The second RAN determines whether there is an X2 interface between the second RAN and the first RAN. If there is an X2 interface, step 6a is subsequently performed. If there is no X2 interface, step 6b is performed.

6a. The second RAN sends the cookie to the first RAN by using the X2 interface.

Specifically, the second RAN extracts the cookie from the data packet, and sends the cookie to the first RAN by using the X2 interface.

6b. The second RAN sends the cookie to the first RAN by using a core network.

Specifically, the second RAN extracts the cookie from the data packet and sends the cookie to the CN, and the CN sends the cookie to the first RAN based on the RAN ID in the cookie.

7. The first RAN sends a cookie key and cookie information to the second RAN.

After receiving the cookie, the first RAN sends the cookie key and the stored cookie information to the second RAN.

8. The second RAN verifies the cookie.

The second RAN verifies the cookie by using the cookie information obtained from the first RAN. For a specific verification process, refer to the description in step 5 in the embodiment of FIG. 6. Details are not described herein again.

If a verification result is that the cookie is complete and valid, it indicates that the verification on the cookie succeeds, and step 9a is subsequently performed. If a verification result is that the cookie is to expire, step 9b is subsequently performed. If a verification result is that the cookie is invalid, it indicates that the verification on the cookie fails, and step 9c is subsequently performed.

9a. The second RAN decrypts raw data based on the cookie information and sends the decrypted raw data to the CN, and the CN sends the raw data to a network.

Refer to the description in step 6a in the embodiment of FIG. 9. Details are not described herein again.

9b. The second RAN performs fast re-authentication with the UE.

The second RAN may perform the fast re-authentication with the UE based on a cookie ID and the cookie key. For a detailed process, refer to the descriptions in the embodiments of FIG. 7 and FIG. 8. Details are not described herein again.

9c. The second RAN and the UE similarly perform steps 1, 2, and 3.

Similarly, refer to the description in step 6c in the embodiment of FIG. 6. Details are not described herein again.

The embodiment of FIG. 10 may be applied to a mobility communication scenario. It should be noted that, for the embodiment of FIG. 10, in a possible implementation, because the second RAN already stores the cookie information obtained from the first RAN, if subsequently the UE further sends the data packet to the second RAN, data transmission between the UE and the second RAN may be considered as non-mobility communication. For a specific data transmission process, refer to the description in the embodiment of FIG. 9.

After implementation of this embodiment of the present invention, when the UE, such as an IoT device, accesses the network for the first time, after performing authentication with the network side to verify the identity, the UE obtains the cookie issued by the first RAN. Then, when the UE has a requirement for transmitting data (for example, small data), the UE directly sends the data packet carrying the cookie to the second RAN, and does not need to perform authentication and establish a network connection again. The second RAN determines, based on the RAN ID in the cookie, that the UE performs RAN communication switching. The second RAN obtains the cookie information from the first RAN, and verifies the cookie based on the cookie information, to verify validity of the identity of the UE. After the verification on the cookie succeeds, the second RAN directly processes subsequent transmission of the data, to complete data communication. The implementation of this embodiment of the present invention can reduce load on the network side when a large quantity of UEs need to perform communication, thereby increasing data transmission efficiency.

Figure 11:
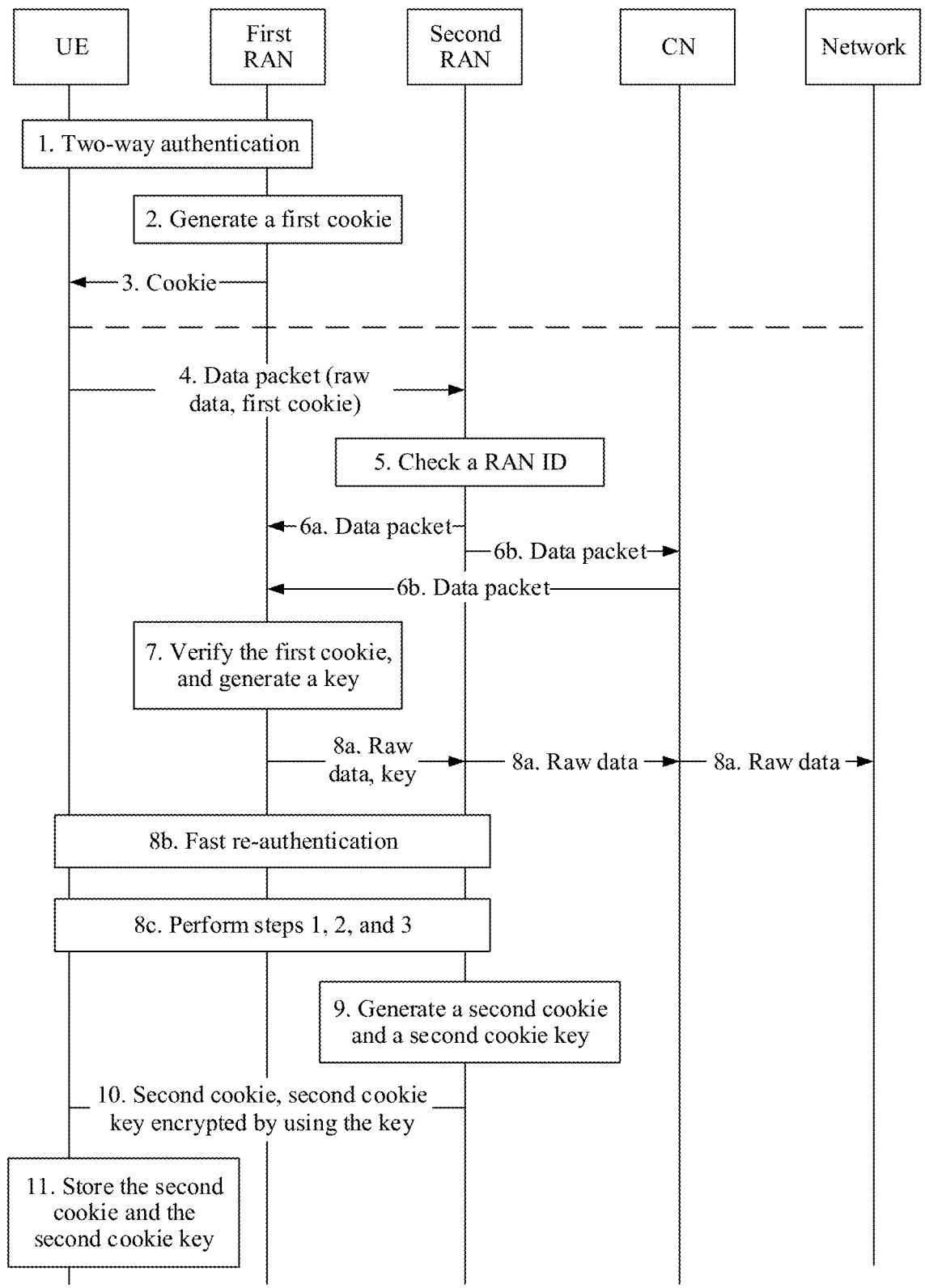
FIG. 11 is a schematic flowchart of another data transmission method according to an embodiment of the present invention.

Referring to FIG. 11, an embodiment provides a data transmission method, including but not limited to the following steps.

1. UE performs two-way authentication with a first RAN, and if the verification succeeds, it is determined that an identity of the UE is authentic and valid.

2. The first RAN generates a first cookie.

Specifically, the first RAN may generate the first cookie for the UE based on a UE ID.

3. The first RAN sends the first cookie to the UE. After obtaining the first cookie, the UE saves the first cookie to a local storage.

It should be noted that, the foregoing steps 1, 2, and 3 are used to explain that a network side configures a corresponding cookie for the UE after the identity of the UE is determined as valid. In other words, during application of this embodiment of the present invention, the foregoing steps 1, 2, and 3 need to be performed only when the identity authentication on the UE is performed for the first time or subsequent data transmission fails and the two-way authentication needs to be re-performed.

When the UE has completed first cookie configuration, if the UE needs to perform data transmission with the network side, the following steps 4 to 8 (including 8a, 8b, and 8c) may be directly performed. Details are described as follows.

4. The UE sends a data packet to a second RAN.

In a specific application scenario, the UE may need to switch current communication from the first RAN to the second RAN. When the UE has a requirement for sending a data packet (for example, small data), the UE directly sends the data packet to the second RAN. The data packet carries the cookie. For a format of the data packet, refer to the descriptions in the embodiments of FIG. 4 and FIG. 5. Details are not described herein again.

5. The second RAN checks a RAN ID of the first cookie.

After receiving the data packet, the second RAN checks a cookie type in the first cookie, and determines that the cookie type indicates an access network device. Then, the second RAN checks the RAN ID included in the cookie, and finds that the RAN ID is not an ID of the second RAN, but is an ID of the first RAN (namely, a first RAN ID). The second RAN determines whether there is an X2 interface between the second RAN and the first RAN. If there is an X2 interface, step 6a is subsequently performed. If there is no X2 interface, step 6b is performed.

6a. The second RAN sends the data packet to the first RAN by using the X2 interface.

6b. The second RAN sends the data packet to the first RAN by using a core network.

Specifically, the second RAN sends the data packet to the CN, and the CN checks the RAN ID in the first cookie in the data packet, and forwards the data packet to the first RAN.

7. The first RAN verifies the first cookie in the data packet.

The first RAN verifies the first cookie in the data packet by using stored cookie information. For a specific verification process, refer to the description in step 5 in the embodiment of FIG. 6. Details are not described herein again.

If a verification result is that the first cookie is complete and valid, it indicates that the verification on the cookie succeeds, and the first RAN verifies a first MAC in the data packet and decrypts raw data. In a possible embodiment, the first RAN further derives a new key (new key) by using a first cookie key (Ki for short) of the first cookie and an ID of the second RAN (namely, a second RAN ID). Specifically, new key=KDF(Ki, second RAN ID), and step 8a is subsequently performed.

If a verification result is that the first cookie is to expire, step 8b is subsequently performed.

If a verification result is that the cookie is invalid, it indicates that the verification on the cookie fails, and step 8c is subsequently performed.

8a. The first RAN sends the new key and the decrypted raw data to the second RAN, and the second RAN sends the decrypted raw data to the CN. The CN forwards the data to an application server in an external network (where, for example, when the UE is an IoT device, the application server may be an IoT platform). The application server sends an acknowledgment message (Ack) to the CN, to indicate that the data is received. The CN sends an acknowledgment message (Ack) to the second RAN, to indicate that the data is received. The second RAN sends an acknowledgment message (Ack) to the UE, to indicate that the data is received.

It should be noted that, in a possible embodiment of the present invention, step 8a may further be: the first RAN sends the decrypted raw data to the CN/application server, and sends the new key to the second RAN.

8b. The first RAN sends cookie information of the first cookie to the second RAN, and the second RAN performs fast re-authentication with the UE.

Specifically, the second RAN may perform the fast re-authentication with the UE based on the cookie information. For a detailed process, refer to the descriptions in the embodiments of FIG. 7 and FIG. 8. Details are not described herein again.

8c. The second RAN and the UE similarly perform steps 1, 2, and 3.

Similarly, refer to the description in step 6c in the embodiment of FIG. 6. Details are not described herein again.

During specific implementation of the present invention, subsequently, the embodiment of FIG. 11 may further include steps 9 to 11, and an objective of steps 9 to 11 is: the second RAN generates a second cookie, and configures the second cookie for the UE. Details are described as follows.

9. The second RAN generates a second cookie and a second cookie key.

Details are as follows. The second RAN generates the second cookie and the second cookie key based on the UE ID.

10. The second RAN sends the second cookie and the second cookie key to the UE.

In a possible embodiment, the second RAN encrypts the second cookie key by using the new key (new key) obtained from the first RAN. The encrypting the second cookie key is specifically: En(second cookie key, new key). Then, the second RAN directly sends the second cookie and the encrypted second cookie key to the UE.

In another possible embodiment, the second RAN encrypts the second cookie key by using the new key obtained from the first RAN, and then sends, to the UE, the RAN ID of the second RAN (namely, the second RAN ID), the second cookie, the encrypted second cookie key, and the acknowledgment message (Ack) obtained from the CN in the foregoing step 8a of this embodiment.

In addition, for a second RAN side, the second RAN stores cookie information corresponding to the second cookie.

11. The UE stores the second cookie and the second cookie key.

Specifically, the UE derives the new key (new key) by using the received second RAN ID and the original locally-stored first cookie key, and a specific derivation process is: new key=KDF(first cookie key, second RAN ID). Then, the UE obtains the second cookie key through decryption by using the new key. The UE stores the second cookie and the second cookie key. It may be understood that, when the UE has a subsequent data transmission requirement, the UE generates a data packet based on the second cookie and the second cookie key.

The embodiment of FIG. 11 may be applied to a mobility communication scenario. It should be noted that, for the embodiment of FIG. 10, in a possible implementation (as described in steps 9 to 11), if the second RAN configures the second cookie for the UE, data transmission between the UE and the second RAN may be considered as non-mobility communication if subsequently the UE further sends the data packet to the second RAN. For a specific data transmission process, refer to the description in the embodiment of FIG. 9.

After implementation of this embodiment of the present invention, when the UE, such as the IoT device, accesses the network for the first time, after performing authentication with the network side to verify the identity, the UE obtains the first cookie issued by the first RAN. Then, when the UE has a requirement for transmitting data (for example, small data), the UE directly sends the data packet carrying the first cookie to the second RAN, and does not need to perform authentication and establish a network connection again. The second RAN determines, based on the RAN ID in the first cookie, that the UE performs RAN communication switchover, and sends the data packet to the first RAN. The first RAN verifies the cookie based on the cookie information, to verify validity of the identity of the UE. The second RAN obtains the decrypted raw data from the first RAN, and sends the decrypted raw data to the CN, to complete data communication. The implementation of this embodiment of the present invention can reduce load on the network side when a large quantity of UEs need to perform communication, thereby increasing data transmission efficiency.

Figure 12:
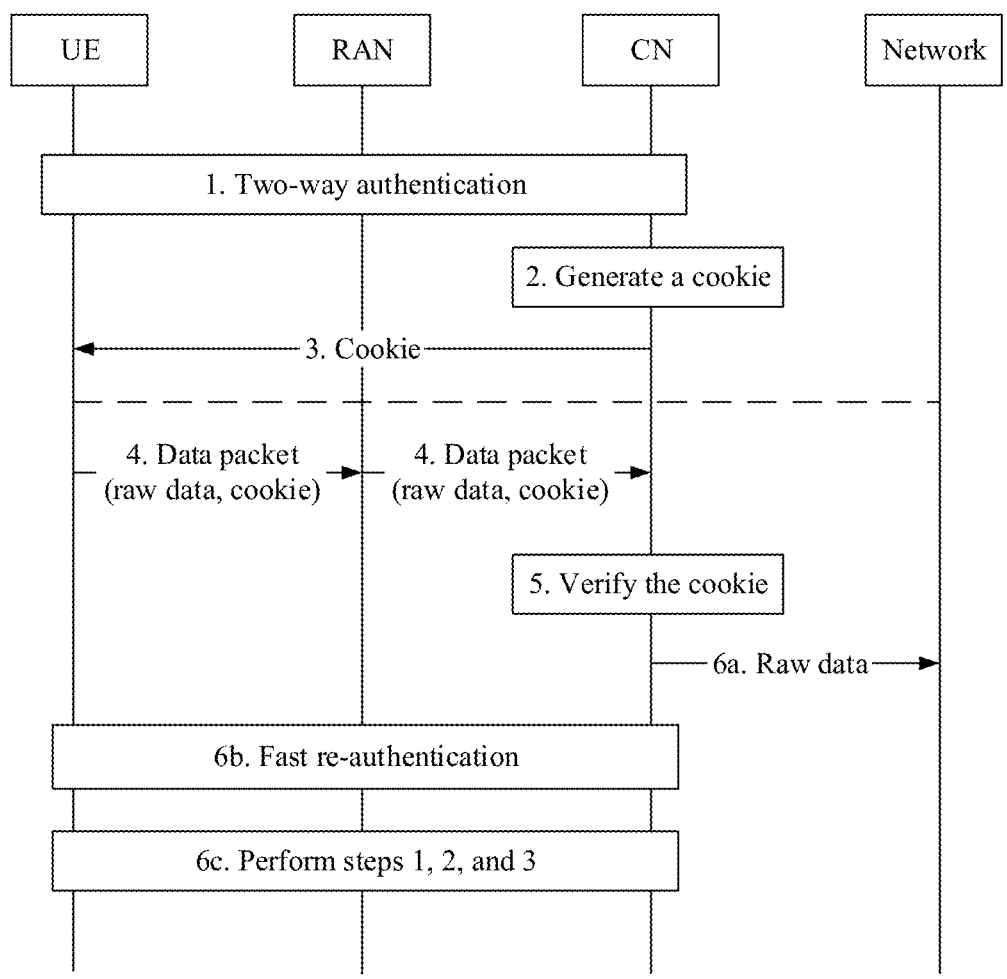
FIG. 12 is a schematic flowchart of another data transmission method according to an embodiment of the present invention.

Referring to FIG. 12, an embodiment of the present invention provides another data transmission method, including but not limited to the following steps.

1. UE performs two-way authentication with a CN, and if the verification succeeds, it is determined that an identity of the UE is authentic and valid.

2. The CN generates a cookie.

The CN generates the cookie for the UE based on related information of the UE, and specifically, generates the cookie for the UE based on a UE ID.

3. The CN sends the cookie to the UE. Correspondingly, after obtaining the cookie sent by the CN, the UE saves the cookie to a local storage.

It should be noted that, the foregoing steps 1, 2, and 3 are used to explain that a network side configures a corresponding cookie for the UE after the identity of the UE is determined as valid. In other words, during application of this embodiment of the present invention, the foregoing steps 1, 2, and 3 need to be performed only when the identity authentication on the UE is performed for the first time or subsequent data transmission fails and the two-way authentication needs to be re-performed.

When the UE has completed cookie configuration, if the UE needs to perform data transmission with the network side, the following steps 4 to 6 (including 6a, 6b, and 6c) may be directly performed. Details are described as follows.

4. The UE sends a data packet to the RAN, and the RAN forwards the data packet to the CN.

In a specific embodiment of the present invention, the data packet may include small data. The small data carries the cookie. For a format of the small data, refer to the descriptions in the embodiments of FIG. 2 and FIG. 3. Details are not described herein again.

When the UE has a requirement for sending small data, the UE directly sends the small data to the RAN. After receiving the small data, the RAN first checks a cookie type in the small data, determines the cookie type indicates a core network device, and then the RAN sends the small data to the CN.

5. The CN verifies the cookie.

After receiving the data packet (for example, small data), the CN checks a cookie type of the cookie in the data packet, and determines that the data packet is processed by the core network device. The CN then verifies the cookie in the data packet based on cookie information pre-stored in the local storage. For a specific verification process, refer to the description in step 5 in the embodiment of FIG. 6. Details are not described herein again.

If a verification result is that the cookie is complete and valid, it indicates that the verification on the cookie succeeds, and step 6a is subsequently performed. If a verification result is that the cookie is to expire, step 6b is subsequently performed. If a verification result is that the cookie is invalid, it indicates that the verification on the cookie fails, and step 6c is subsequently performed.

6a. The CN sends raw data to an external network.

Specifically, the CN performs an integrity check based on a first MAC in the data packet, and after the verification succeeds, the CN decrypts the raw data.

For example, if the raw data in the data packet is encrypted by using a cookie key, the CN derives the cookie key (Ki for short) based on the received cookie and a stored master key (K for short). A specific derivation method is: Ki=KDF(cookie ID, expire time, cookie type, K), and then the CN decrypts the raw data.

The CN forwards the raw data to an external network. In a specific application scenario, if the UE is an IoT device, the CN forwards the data to an IoT platform. Then, the IoT platform sends an acknowledgment message (Ack) to the CN, to indicate, to the CN, that the data is received. The CN sends an acknowledgment message (Ack) to the RAN, to indicate, to the RAN, that the data is received. The RAN further sends an acknowledgment message (Ack) to the IoT device, to indicate, to the IoT device, that the data is received.

6b. The CN performs fast re-authentication with the UE.

The CN may perform the fast re-authentication with the UE based on a cookie ID and a cookie key. For a detailed process, refer to the descriptions in the embodiments of FIG. 7 and FIG. 8. Details are not described herein again.

For the raw data in the data packet, in a specific embodiment, the CN sends the decompressed raw data to the external network. In another specific embodiment, the CN may discard the data packet, and after the fast re-authentication, the UE may generate a new data packet by using a new cookie, a new cookie key, and the raw data, and then resend the new data packet to the CN.

6c. The CN and the UE re-perform steps 1, 2, and 3.

Refer to the description in step 6c in the embodiment of FIG. 6. Details are not described herein again.

The foregoing embodiment of FIG. 12 may be applied to a non-mobility communication scenario. After implementation of this embodiment of the present invention, when the UE, such as the IoT device, accesses the network for the first time, after performing authentication with the network side to verify the identity, the UE obtains the cookie issued by the CN. Then, when the UE has a requirement for transmitting data (for example, small data), the UE directly sends the data packet carrying the cookie to the CN, and does not need to perform authentication and establish a network connection again. The CN verifies validity of the identity of the UE by verifying the cookie. After the verification on the cookie succeeds, the CN directly processes subsequent transmission of the data, to complete data communication. The implementation of this embodiment of the present invention can reduce load on the network side when a large quantity of UEs need to perform communication, thereby increasing data transmission efficiency.

The foregoing describes the method in the embodiments of the present invention, and the following describes a related device in the embodiments of the present invention.

Figure 13:
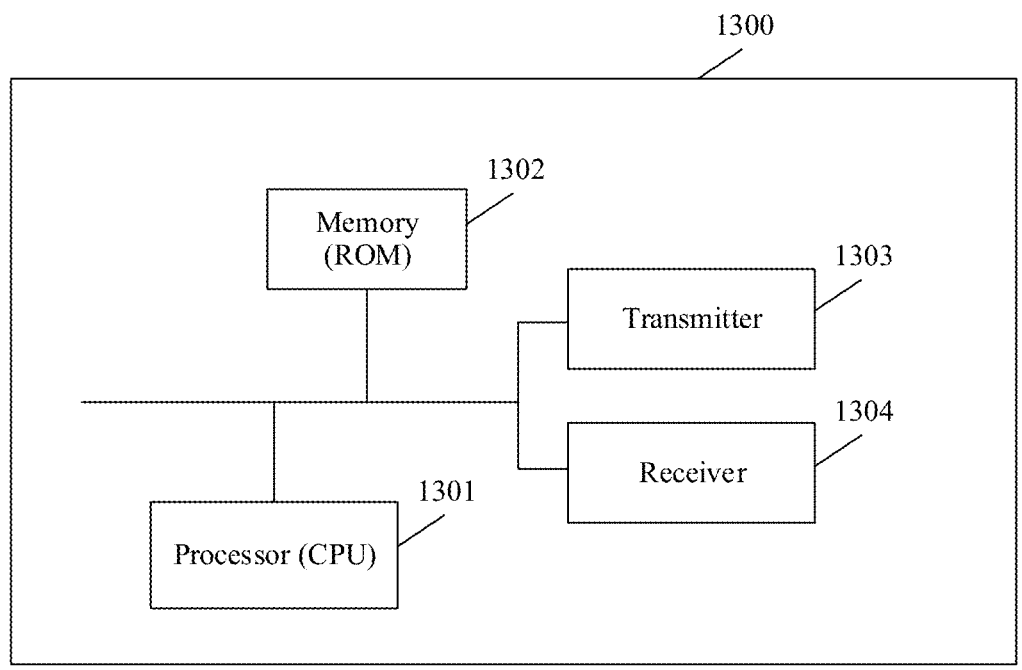
FIG. 13 is a schematic structural diagram of a hardware device according to an embodiment of the present invention.

Referring to FIG. 13, an embodiment of the present invention provides a hardware device 1300. The hardware device 1300 includes a processor 1301, a memory 1302, a transmitter 1303, and a receiver 1304. The processor 1301, the memory 1302, the transmitter 1303, and the receiver 1304 are connected to each other (for example, connected to each other by using a bus).

The memory 1302 includes but is not limited to a random access memory (Random Access Memory, RAM), a read-only memory (Read-Only Memory, ROM), an erasable programmable read only memory (Erasable Programmable Read Only Memory, EPROM), or a compact disc read-only memory (Compact Disc Read-Only Memory, CD-ROM). The memory 1302 is configured to store related program code and data (such as cookie information on a network side).

The receiver 1304 is configured to receive the data. The transmitter 1303 is configured to transmit the data.

The processor 1301 may be one or more central processing units (Central Processing Unit, CPU). When the processor 1301 is one CPU, the CPU may be a single-core CPU or a multi-core CPU.

The processor 1301 is configured to read the program code stored in the memory 1302, to implement a function of the network device in the embodiment of FIG. 6.

When the hardware device 1300 is an access network device, the program code stored in the memory 1302 is specifically used to implement a function of the RAN in the embodiment of FIG. 9, FIG. 10, or FIG. 11. Details are as follows:

the memory is configured to store first cookie information;

the receiver is configured to receive a data packet sent by user equipment, where the data packet includes a first cookie and raw data; and the processor is configured to verify the first cookie based on the stored cookie information, to obtain a verification result, and is further configured to process the raw data based on the verification result.

In a specific embodiment of the present invention, the first cookie includes an expire time T, and an access network verifies the first cookie at a time T0; and that the processor is configured to verify the first cookie, to obtain a verification result includes:

if T0<T−TX, the verification result is that the first cookie is valid;

if T−TX<T0<T+TX, the verification result is that the first cookie is to expire; or if T0>T+TX, the verification result is that the first cookie is invalid, where TX is a preset time value.

Correspondingly, if the verification result is that the first cookie is valid, the processor is configured to decrypt the raw data, and the transmitter is configured to send the decrypted raw data to a core network device.

If the verification result is that the first cookie is to expire, the processor is configured to perform fast re-authentication with the user equipment, to update the first cookie in the user equipment, and the transmitter is configured to send the decrypted raw data to a core network device.

In a specific embodiment, before the receiver receives the data packet sent by the user equipment, the following is included:

the processor performs two-way authentication with the user equipment; and after the authentication succeeds, the processor generates the first cookie based on a user equipment identifier.

In a specific embodiment, the first cookie further includes a first cookie type, and the first cookie type is used to indicate that the first cookie is generated by an access network device or a core network device.

Specifically, that the processor is configured to verify the first cookie based on the first cookie information includes:

when the first cookie type indicates that the first cookie is verified by the access network device, the processor is configured to verify the first cookie based on the first cookie information.

In a specific embodiment, the first cookie further includes: a first cookie ID and a first message authentication code MAC, where first MAC=HMAC(first cookie ID∥expire time∥first cookie type∥first cookie key), where the first cookie key is a key derived by the processor;

first cookie key=KDF(first cookie ID, expire time, first cookie type, K); and

HMAC is a hash-based message authentication code related to the key, KDF is a key derivation function, and K is a master key preset by the first access network device; and the processor is configured to: identify the first cookie based on the first cookie ID, and perform an integrity check on the first cookie based on the first MAC.

In a possible embodiment, the first cookie further includes: the encrypted user equipment identifier and an encrypted fast re-authentication counter, where the first MAC is specifically:

first MAC=HMAC(first cookie ID||expire time||first cookie type||En(user equipment identifier, K)||En(fast re-authentication counter, K), first cookie key), where En is an encryption function.

In a specific embodiment, when the cookie is to expire, the processor performs fast re-authentication with the user equipment, to update the cookie in the user equipment, and a verification process includes:

generating, by the processor, a second cookie; and sending, by the transmitter, a first message to the user equipment, to update the first cookie and the first cookie key in the user equipment. The first message includes the second cookie, a second cookie key, and a second cookie ID, and the second cookie key is a key derived by the processor based on the preset master key.

The first message is a fast re-authentication message, and the fast re-authentication message may include:

(1) an AT_IV field, where the AT_IV field carries the second cookie key and/or the second cookie;

(2) an AT_ENCR_DATA field, where the AT_ENCR_DATA field carries the second cookie and/or the second cookie key;

(3) an encrypted AT_NEXT_REAUTH_ID field, where the encrypted AT_NEXT_REAUTH_ID field carries the second cookie ID;

(4) an encrypted AT_COUNTER field, where the encrypted AT_COUNTER field may indicate the encrypted fast re-authentication counter;

(5) an encrypted AT_NONCE_S field, where the encrypted AT_NONCE _S indicates an encrypted random number value nonce generated by a server; and (6) an encrypted AT_NEXT_REAUTH_ID field, where the AT_MAC is used to perform integrity protection on the entire fast re-authentication message.

In a possible embodiment, the first cookie further includes a first access network device identifier RAN ID, and the RAN ID is used to indicate an ID of an access network device that generates the first cookie.

After the receiver receives the data packet sent by the user equipment, the following is further included: the processor checks whether the RAN ID is an ID of the first access network device; and that the processor verifies the first cookie is specifically: when the RAN ID is the ID of the first access network device, the processor verifies the first cookie.

In a specific embodiment, before the processor verifies the first cookie, the following is further included:

when the RAN ID is not the ID of the access network, the transmitter sends the first cookie to a second access network device indicated by the RAN ID; and the receiver receives second cookie information fed back by the second access network device based on the first cookie, where the second cookie information is stored in the second access network device, and the second cookie information includes the first cookie ID, the first cookie key, and the user equipment identifier; and that the processor verifies the first cookie includes: the processor verifies the first cookie based on the second cookie information.

That the transmitter sends the first cookie to a second access network device indicated by the RAN ID includes two cases:

Case 1: If there is an X2 interface between the first access network device and the second access network device, the transmitter sends, by using the X2 interface, the first cookie to the second access network device indicated by the RAN ID.

Case 2: If there is no X2 interface between the first access network device and the second access network device, the transmitter sends, by using the core network device, the first cookie to the second access network device indicated by the RAN ID.

In a possible embodiment, when the RAN ID is not the ID of the access network, the transmitter is configured to send the data packet to a third access network device indicated by the RAN ID. The receiver is configured to receive the decrypted raw data fed back by the third access network device; and the transmitter is configured to send the decrypted raw data to a core network.

In a specific embodiment, the receiver is further configured to receive a key fed back by the third access network device, where the key is generated by the third access network device based on the first cookie key and the ID of the first access network; the processor is configured to generate a third cookie and a third cookie key based on the user equipment identifier. An RAN ID in the third cookie indicates the ID of the first access network device.

The transmitter is configured to send the third cookie and the third cookie key encrypted by using the key to the user equipment, so that the user equipment updates the first cookie and the first cookie key by using the third cookie and the third cookie key.

It should be noted that, when the hardware device 1300 is an access network device, for related technical features of the processor 1301, the memory 1302, the transmitter 1303, and the receiver 1304, refer to related content of the first RAN and the second RAN in the embodiments of FIG. 9 to FIG. 11. Details are not described herein again.

When the hardware device 1300 is a core network device, the program code stored in the memory 1302 is specifically used to implement a function of the CN in the embodiment of FIG. 12. Details are as follows:

the memory is configured to store first cookie information;

the receiver is configured to receive a data packet sent by user equipment, where the data packet includes a first cookie and encrypted raw data;

the processor is configured to verify the first cookie based on the stored cookie information, to obtain a verification result; and the processor is further configured to process the raw data based on the verification result.

In a specific embodiment, the first cookie includes an expire time T, and an access network verifies the first cookie at a time T0, where if T0<T−TX, the verification result is that the first cookie is valid;

if T−TX<T0<T+TX, the verification result is that the first cookie is to expire; or if T0>T+TX, the verification result is that the first cookie is invalid, where TX is a preset time value.

Correspondingly, if the verification result is that the first cookie is valid, the processor decrypts the raw data, and the transmitter sends the decrypted raw data to a target server.

If the verification result is that the first cookie is to expire, the processor performs fast re-authentication with the user equipment, to update the first cookie in the user equipment, and the transmitter sends the decrypted raw data to a target server.

In a specific embodiment, before the receiver receives the data packet sent by the user equipment, the following is included: the processor performs two-way authentication with the user equipment; and after the authentication succeeds, the processor generates the first cookie based on a user equipment identifier.

In a specific embodiment, the first cookie includes: the encrypted user equipment identifier, an encrypted fast re-authentication counter, a cookie type, a first cookie ID, and a message authentication code MAC, where MAC=HMAC(first cookie ID‖expire time‖cookie type‖En(user equipment identifier, K)‖En(fast re-authentication counter, K), first cookie key), where En is an encryption function.

Specifically, the receiver is configured to receive the data packet based on the first cookie type, and the processor is configured to: identify the first cookie based on the first cookie ID, and perform an integrity check on the first cookie based on the MAC.

In a specific embodiment, when the cookie is to expire, the processor performs fast re-authentication with the user equipment, and an authentication process includes:

generating, by the processor, a second cookie; sending, by the transmitter, a first message to the user equipment, to update the first cookie and the first cookie key in the user equipment. The first message includes the second cookie, a second cookie key, and a second cookie ID, and the second cookie key is a key derived by the processor based on a preset master key.

The first message is a fast re-authentication message, and the fast re-authentication message may include:

(1) an AT_IV field, where the AT_IV field carries the second cookie key and/or the second cookie;

(2) an AT_ENCR_DATA field, where the AT_ENCR_DATA field carries the second cookie and/or the second cookie key;

(3) an encrypted AT_NEXT_REAUTH_ID field, where the encrypted AT_NEXT_REAUTH_ID field carries the second cookie ID;

(4) an encrypted AT_COUNTER field, where the encrypted AT_COUNTER field may indicate the encrypted fast re-authentication counter;

(5) an encrypted AT_NONCE_S field, where the encrypted AT_NONCE_S indicates an encrypted random number value nonce generated by a server; and (6) an encrypted AT_NEXT_REAUTH_ID field, where the AT_MAC is used to perform integrity protection on the entire fast re-authentication message.

It should be noted that, when the hardware device 1300 is the core network device, for related technical features of the processor 1301, the memory 1302, the transmitter 1301, and the receiver 1304, refer to related content of the CN in the embodiment of FIG. 12. Details are not described herein again.

When the hardware device 1300 is user equipment, the program code stored in the memory 1302 is specifically used to implement a function of the UE in the embodiments of FIG. 9 to FIG. 12. Details are as follows:

the receiver 1304 receives a first cookie and a first cookie key that are sent by a network device;

the memory 1302 stores the first cookie and the first cookie key;

the processor 1301 generates a data packet based on the first cookie and the first cookie key, where the data packet includes the first cookie and raw data encrypted by using the first cookie key; and the transmitter 1303 sends the data packet to the network device.

In a specific embodiment, the first cookie includes an expire time T, and an access network verifies the first cookie at a time T0, where if T0<T−TX, a verification result is that the first cookie is valid;

if T−TX<T0<T+TX, a verification result is that the first cookie is to expire; or if T0>T+TX, a verification result is that the first cookie is invalid, where TX is a preset time value.

When T is to expire, the user equipment receives a first message sent by the network device. The first message includes a second cookie, a second cookie key, and a second cookie ID, and the second cookie key is a key derived by a first access network device based on a preset master key. The user equipment updates the first cookie and the first cookie key by using the second cookie and the second cookie key.

In a specific embodiment, the network device is an access network device or a core network device, the user equipment is an internet of things device IoT, and the data packet is small data small data.

It should be noted that, when the hardware device 1300 is the user equipment, for related technical features of the processor 1301, the memory 1302, the transmitter 1301, and the receiver 1304, refer to related content of the UE in the embodiments of FIG. 9 to FIG. 12. Details are not described herein again.

Figure 14:
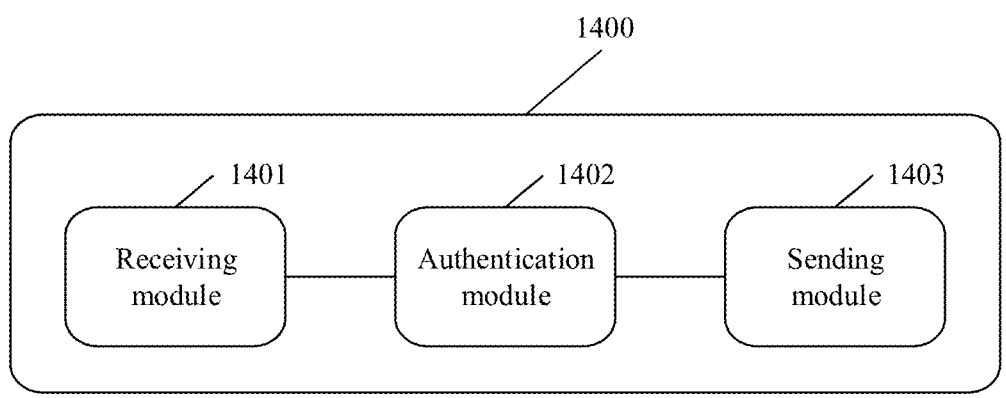
FIG. 14 is a schematic structural diagram of an access network device according to an embodiment of the present invention.

Based on a same inventive concept, an embodiment of the present invention further provides an access network device 1400. As shown in FIG. 14, the access network device 1400 may include: a receiving module 1401, an authentication module 1402, and a sending module 1403.

The receiving module 1401 is configured to receive a data packet sent by user equipment. The data packet includes a first cookie and raw data.

The authentication module 1402 is configured to: verify the first cookie, to obtain a verification result; and process the raw data based on the verification result.

The sending module 1403 is configured to send the data packet to a core network device/an external network or another access network device.

It should be noted that the detailed descriptions of the RAN in the embodiments of FIG. 9 to FIG. 11 enable a person skilled in the art to clearly know an implementation method of each function module included in the access network device 1400. Therefore, for brevity of the specification, details are not described herein again.

Figure 15:
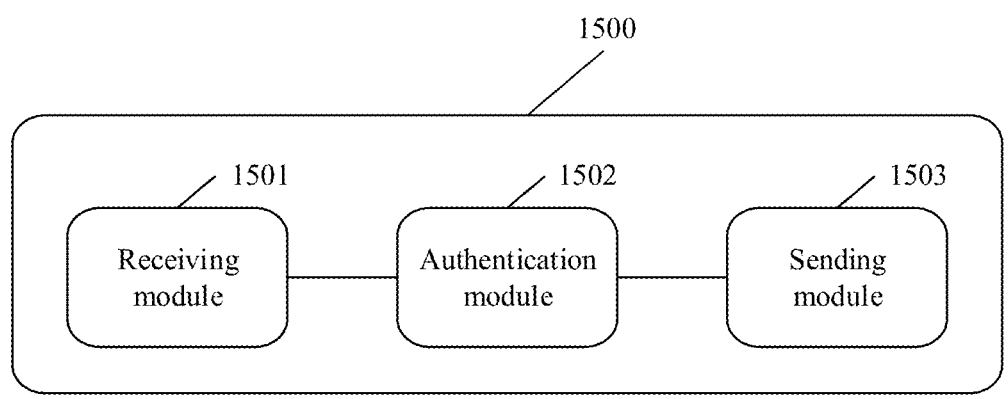
FIG. 15 is a schematic structural diagram of a core network device according to an embodiment of the present invention.

Based on a same inventive concept, an embodiment of the present invention further provides a core network device 1500. As shown in FIG. 15, the core network device 1500 may include: a receiving module 1501, an authentication module 1502, and a sending module 1503.

The receiving module 1501 is configured to receive a data packet sent by user equipment, where the data packet includes a first cookie and raw data.

The authentication module 1502 is configured to verify the first cookie, to obtain a verification result, and is configured to process the raw data based on the verification result.

The sending module 1503 is configured to send the data packet to an external network/application server.

It should be noted that through a detailed description of the CN in the embodiment of FIG. 12, a person skilled in the art may clearly know an implementation method of each function module included in the core network device 1500. Therefore, for brevity of the specification, details are not described herein again.

Figure 16:
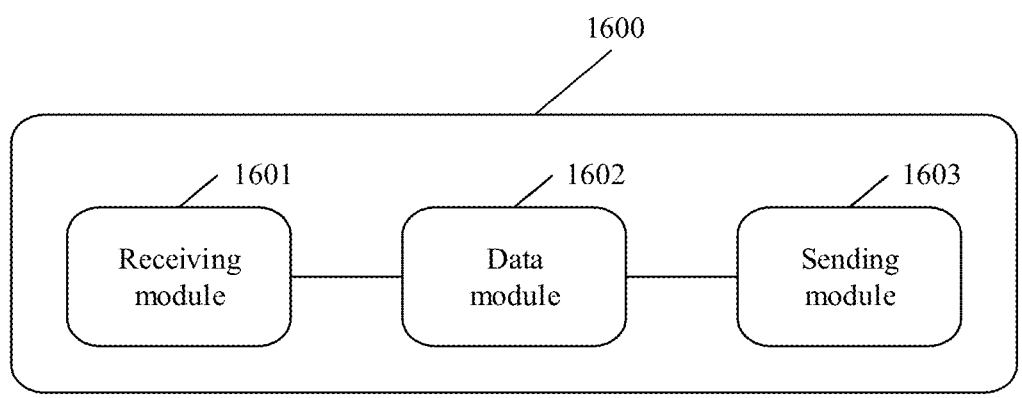
FIG. 16 is a schematic structural diagram of user equipment according to an embodiment of the present invention.

Based on a same inventive concept, an embodiment of the present invention further provides user equipment 1600. As shown in FIG. 16, the user equipment 1600 may include: a receiving module 1601, a data module 1602, and a sending module 1603.

The receiving module 1601 is configured to receive a first cookie and a first cookie key that are sent by a network device.

The data module 1602 is configured to generate a data packet based on the first cookie and the first cookie key. The data packet includes the first cookie and raw data encrypted by using the first cookie key.

The sending module 1603 is configured to send the data packet to the network device. The network device is an access network device or a core network device.

It should be noted that the detailed descriptions of the UE in the embodiments of FIG. 9 to FIG. 12 enable a person skilled in the art to clearly know an implementation method of each function module included in the user equipment 1600. Therefore, for brevity of the specification, details are not described herein again.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, all or a part of the procedures or functions are generated according to the embodiments of the present invention. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

In the foregoing embodiments, the descriptions in each embodiment have respective focuses. For a part that is not described in detail in an embodiment, refer to related descriptions in other embodiments.

The foregoing descriptions are merely implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
receiving, by a first access network device, a data packet sent by a user equipment, wherein the data packet comprises a first cookie and raw data;
verifying, by the first access network device, the first cookie, to obtain a verification result; and
processing, by the first access network device, the raw data based on the verification result, wherein the first cookie comprises an expire time T, and the first access network verifies the first cookie at a time T0; and
the verifying, by the first access network device, the first cookie, to obtain a verification result comprises:
determining whether T0<T−TX, and when T0<T−TX the verification result is that the first cookie is valid, wherein TX is a preset time value; and
when the verification result is that the first cookie is valid, decrypting, by the first access network device, the raw data, and sending the decrypted raw data to a core network device.

2. The method according to claim 1, wherein before the receiving, by a first access network device, a data packet sent by user equipment, the method further comprises:
performing, by the first access network device, two-way authentication with the user equipment; and
after the authentication succeeds, generating, by the first access network device, the first cookie based on a user equipment identifier.

3. The method according to claim 1, wherein the first cookie further comprises a first cookie type, wherein the first cookie type is used to indicate that the first cookie is generated by an access network device or a core network device; and
the verifying, by the first access network device, the first cookie comprises:
when the first cookie type indicates that the first cookie is generated by the access network device, verifying, by the first access network device, the first cookie.

4. The method according to claim 3, wherein the first cookie further comprises: a first cookie ID and a first message authentication code (MAC), wherein
first MAC is a hash-based message authentication code (HMAC) including the following fields: (first cookie ID, expire time, first cookie type, first cookie key), wherein
the first cookie key is a key derived by the access network device, and the first cookie key is created using a key derivation function (KDF) including the following fields: (first cookie ID, expire time, first cookie type, key (K)); and
HMAC is related to the KDF, and K is a master key preset by the first access network device; and
the first access network device identifies the first cookie based on the first cookie ID, and performs an integrity check on the first cookie based on the first MAC.

5. The method according to claim 4, wherein the first cookie further comprises: the encrypted user equipment identifier and an encrypted fast re-authentication counter; and
the first MAC is an HMAC including the following fields (first cookie ID, expire time, first cookie type, En(user equipment identifier, K), En(fast re-authentication counter, K), first cookie key), wherein En is an encryption function.

6. The method according to claim 1, further comprising performing, by the first access network device, fast re-authentication with the user equipment comprising:
generating, by the first access network device, a second cookie; and
sending, by the first access network device, a first message to the user equipment, to update the first cookie and a first cookie key in the user equipment, wherein the first message comprises the second cookie, a second cookie key, and a second cookie ID, and the second cookie key is a key derived by the first access network device based on a preset master key.

7. The method according to claim 6, wherein the first message comprises an AT_IV field, an AT_ENCR_DATA field, and an encrypted AT_NEXT_REAUTH_ID field, wherein the AT_IV field carries at least one of the second cookie key and the second cookie, the AT_ENCR_DATA field carries at least one of the second cookie and the second cookie key, and the encrypted AT_NEXT_REAUTH_ID field carries the second cookie ID.

8. The method according to claim 1, wherein the first cookie further comprises a first access network device identifier (RAN ID), and the RAN ID is used to indicate an ID of an access network device that generates the first cookie;
  after the receiving, by a first access network device, a data packet sent by the user equipment, the method further comprises: checking, by the first access network device, whether the RAN ID is an ID of the first access network device; and
  the verifying, by the first access network device, the first cookie comprises when the RAN ID is the ID of the first access network device, verifying, by the first access network device, the first cookie.

9. An access network device, comprising: a transmitter, a receiver, a memory, and a processor coupled to the memory, wherein the transmitter, the receiver, the memory, wherein
  the memory is configured to store first cookie information;
  the receiver is configured to receive a data packet sent by user equipment, wherein the data packet comprises a first cookie and raw data; and
  the processor is configured to verify the first cookie based on the stored cookie information, to obtain a verification result, and is further configured to process the raw data based on the verification result, wherein the first cookie comprises an expire time T, and the access network verifies the first cookie at a time T0; and
  that the processor is configured to verify the first cookie, to obtain a verification result comprises:
  determining whether T0<T−TX, and when T0<T−TX the verification result is that the first cookie is valid; and
  when the verification result is that the first cookie is valid, the processor is configured to decrypt the raw data, and the transmitter is configured to send the decrypted raw data to a core network device.

10. The access network device according to claim 9,
  wherein the processor is configured to perform two-way authentication with the user equipment; and
  after the authentication succeeds, generate the first cookie based on a user equipment identifier.

11. The access network device according to claim 9, wherein the first cookie further comprises a first cookie type, and the first cookie type is used to indicate that the first cookie is generated by an access network device or a core network device; and the processor is configured to verify the first cookie based on the first cookie information comprises:
  when the first cookie type indicates that the first cookie is verified by the access network device, the processor is configured to verify the first cookie based on the first cookie information.

12. The access network device according to claim 11, wherein the first cookie further comprises: a first cookie ID and a first message authentication code (MAC), wherein
  first MAC is a hash-based message authentication code (HMAC) including the following fields: (first cookie ID, expire time, first cookie type, first cookie key), wherein
  the first cookie key is a key derived by the processor, and the first cookie key is created using a key derivation function (KDF) including the following fields: (first cookie ID, expire time, first cookie type, key (K)); and
  HMAC is related to the KDF and K is a master key preset by the first access network device; and
  the processor is configured to: identify the first cookie based on the first cookie ID, and perform an integrity check on the first cookie based on the first MAC.

13. The access network device according to claim 12, wherein the first cookie further comprises: the encrypted user equipment identifier and an encrypted fast re-authentication counter; and
  the first MAC is an HMAC including the following fields (first cookie ID, expire time, first cookie type, En(user equipment identifier, K), En(fast re-authentication counter, K), first cookie key), wherein En is an encryption function.

14. The access network device according to claim 9, wherein that the processor is further configured to perform fast re-authentication with the user equipment comprising:
  generating, by the processor, a second cookie; and
  sending, by the transmitter, a first message to the user equipment, to update the first cookie and a first cookie key in the user equipment, wherein the first message comprises the second cookie, a second cookie key, and a second cookie ID, and the second cookie key is a key derived by the processor based on a preset master key.

15. The access network device according to claim 14, wherein that the first message comprises the second cookie, a second cookie key, and a second cookie ID is specifically:
  the first message comprises an AT_IV field, an AT_ENCR_DATA field, and an encrypted AT_NEXT_REAUTH_ID field, wherein the AT_IV field carries at least one of the second cookie key and the second cookie, the AT_ENCR_DATA field carries at least one of the second cookie and the second cookie key, and the encrypted AT_NEXT_REAUTH_ID field carries the second cookie ID.

16. The access network device according to claim 9, wherein the first cookie further comprises a first access network device identifier (RAN ID), and the RAN ID is used to indicate an ID of an access network device that generates the first cookie;
  after the receiver receives the data packet sent by the user equipment, the processor checks whether the RAN ID is an ID of the first access network device; and
  the processor verifies the first cookie comprises when the RAN ID is the ID of the first access network device, the processor verifies the first cookie.

* * * * *